US012235604B2

(12) United States Patent
Kuwabara et al.

(10) Patent No.: US 12,235,604 B2
(45) Date of Patent: Feb. 25, 2025

(54) IMAGE FORMING APPARATUS WITH A DOOR ON A BODY AND COVER INSIDE THE DOOR

(71) Applicants: Nobuo Kuwabara, Kanagawa (JP); Hiroaki Takagi, Kanagawa (JP)

(72) Inventors: Nobuo Kuwabara, Kanagawa (JP); Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/376,850

(22) Filed: Oct. 5, 2023

(65) Prior Publication Data

US 2024/0118654 A1 Apr. 11, 2024

(30) Foreign Application Priority Data

Oct. 7, 2022 (JP) ................................ 2022-162591

(51) Int. Cl.
*G03G 21/16* (2006.01)

(52) U.S. Cl.
CPC ..... *G03G 21/1633* (2013.01); *G03G 21/1647* (2013.01); *G03G 21/168* (2013.01)

(58) Field of Classification Search
CPC ........... G03G 21/1633; G03G 21/1647; G03G 21/168; G03G 21/1623
See application file for complete search history.

(56) References Cited

U.S. PATENT DOCUMENTS

2006/0140673 A1* 6/2006 Kamimura ......... G03G 21/1647 399/119
2014/0167587 A1* 6/2014 Takenaka ........... G03G 21/1633 312/333
2015/0125192 A1* 5/2015 Tokuda ............. G03G 15/2053 399/329
2016/0011562 A1 1/2016 Shintani et al.
2016/0139555 A1 5/2016 Honjoh et al.
2016/0202660 A1* 7/2016 Terai .................. G03G 21/1647 399/110
2016/0209771 A1 7/2016 Maehata et al.
(Continued)

FOREIGN PATENT DOCUMENTS

JP H8-016064 A 1/1996
JP 2002-318480 A 10/2002
(Continued)

*Primary Examiner* — Sandra Brase
(74) *Attorney, Agent, or Firm* — XSENSUS LLP

(57) ABSTRACT

An image forming apparatus includes a body having an opening, a door on the body, a unit detachably attached to the body from the opening, a cover inside the door, a spring, and a lock. The door covers the opening at a first closed position. The unit is disposed at a mounting position inside the body. The cover is rotatable between a second closed position and an opening position in an opening direction. At the second closed position, the cover covers the unit at the mounting position. At the opening position, the cover forms an angle of 90 degrees or more with the body. The spring applies a force to the cover in the opening direction. The lock locks the cover at the second closed position. The cover displaced from the second closed position in the opening direction restricts a movement of the door to the first closed position.

17 Claims, 14 Drawing Sheets

(56) References Cited

U.S. PATENT DOCUMENTS

| | | | | |
|---|---|---|---|---|
| 2016/0334757 | A1 | 11/2016 | Maehata et al. | |
| 2017/0102663 | A1 | 4/2017 | Tomita et al. | |
| 2018/0046128 | A1 | 2/2018 | Tomita et al. | |
| 2018/0113414 | A1* | 4/2018 | Ando | G03G 21/1633 |
| 2019/0258188 | A1 | 8/2019 | Kuwabara et al. | |
| 2020/0257237 | A1* | 8/2020 | Hyodo | G03G 21/1633 |
| 2020/0409288 | A1* | 12/2020 | Kumagai | G03G 21/1633 |
| 2021/0200124 | A1 | 7/2021 | Watanabe et al. | |

FOREIGN PATENT DOCUMENTS

| | | | |
|---|---|---|---|
| JP | 2012-063752 | A | 3/2012 |
| JP | 2014-232146 | A | 12/2014 |

* cited by examiner

IMAGE FORMING APPARATUS WITH A DOOR ON A BODY AND COVER INSIDE THE DOOR

CROSS-REFERENCE TO RELATED APPLICATION

This patent application is based on and claims priority pursuant to 35 U.S.C. § 119(a) to Japanese Patent Application No. 2022-162591, filed on Oct. 7, 2022, in the Japan Patent Office, the entire disclosure of which is hereby incorporated by reference herein.

BACKGROUND

Technical Field

Embodiments of the present disclosure relate to an image forming apparatus.

Related Art

One type of image forming apparatus includes a door that opens and closes a body of an image forming apparatus and a unit that is detachably attached to the body of the image forming apparatus through an opening of the body of the image forming apparatus by opening the door.

SUMMARY

This specification describes an improved image forming apparatus that includes a body having an opening, a door on the body, a unit detachably attached to the body from the opening, a cover inside the door, a spring, and a lock. The door covers the opening at a first closed position. The unit is disposed at a mounting position inside the body. The cover is rotatable between a second closed position and an opening position in an opening direction. At the second closed position, the cover covers the unit at the mounting position. At the opening position, the cover forms an angle of 90 degrees or more with the body. The spring applies a force to the cover in the opening direction. The lock locks the cover at the second closed position. The cover displaced from the second closed position in the opening direction restricts a movement of the door to the first closed position.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
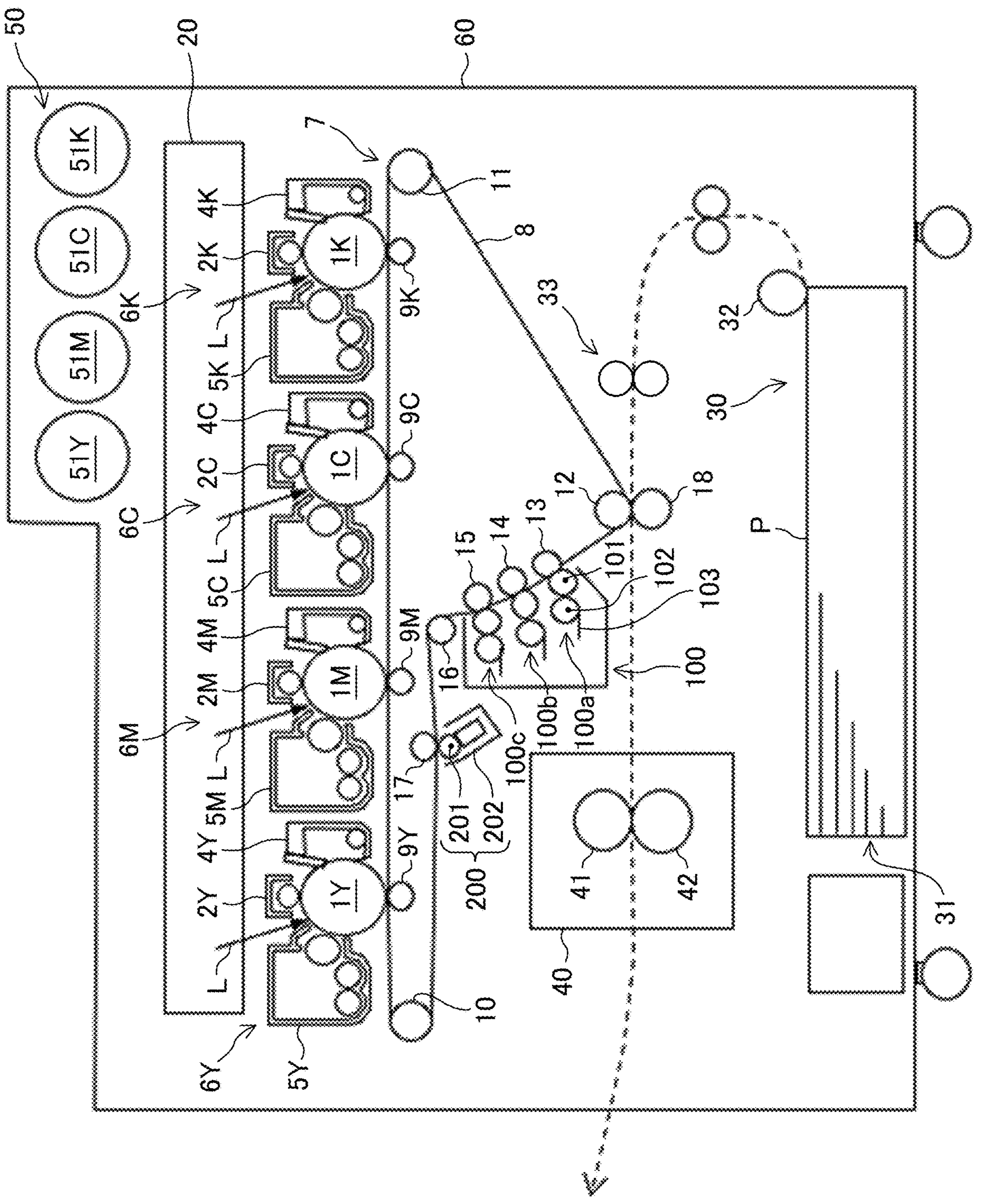
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, embodiments of the present disclosure are described below. Identical reference numerals are assigned to identical or equivalent components and a description of those components may be simplified or omitted.

A tandem type printer employing an intermediate transfer method is described below as an image forming apparatus according to one embodiment of this disclosure. Firstly, a description is given of a basic configuration of the image forming apparatus 60 according to the embodiment of this disclosure. FIG. 1 is a schematic diagram illustrating a configuration of the image forming apparatus 60 according to the embodiment. The image forming apparatus 60 includes four process units 6Y, 6M, 6C, and 6K for forming yellow, magenta, cyan, and black toner images.

The four process units 6Y, 6M, 6C, and 6K include drum-shaped photoconductors 1Y, 1M, 1C, and 1K, respectively. Around the photoconductors 1Y, 1M, 1C, and 1K, the process units 6Y, 6M, 6C, and 6K include charging devices 2Y, 2M, 2C, and 2K, developing devices 5Y, 5C, 5M, and 5K, drum cleaners 4Y, 4M, 4C, and 4K, and dischargers, respectively. Each of the process units 6Y, 6M, 6C, and 6K has the same configuration except that toners of different colors (i.e., yellow (Y), magenta (M), cyan (C), and black (K)) are used.

Above the process units 6Y, 6M, 6C, and 6K, an optical writing unit 20 is disposed. The optical writing unit 20 irradiates the surfaces of the photoconductors 1Y, 1M, 1C, and 1K with laser beams L to optically write electrostatic latent images thereon. Below the process units 6Y, 6M, 6C, and 6K, a transfer unit 7 is disposed. The transfer unit 7 serves as a drawer unit and includes an endless intermediate transfer belt. The transfer unit 7 includes, in addition to the intermediate transfer belt 8, multiple rollers disposed inside the loop of the intermediate transfer belt 8 to stretch the intermediate transfer belt 8, a tension roller 16, a belt cleaner 100, and a lubrication device 200.

The multiple rollers inside the loop of the intermediate transfer belt 8 include four primary transfer rollers 9Y, 9M, 9C, and 9K, a driven roller 10, a drive roller 11, a secondary-transfer backup roller 12, three cleaning backup rollers 13, 14, and 15, and an application brush backup roller 17. The intermediate transfer belt 8 is stretched around a part of circumferential surface of each of these rollers.

Each of the cleaning backup rollers 13, 14, and 15 may not apply a certain tension to the intermediate transfer belt 8. The cleaning backup rollers 13, 14, and 15 may be driven to rotate with the rotation of the intermediate transfer belt 8. A driver drives and rotates the drive roller 11 clockwise in FIG. 1, and rotation of the drive roller 11 rotates the intermediate transfer belt 8 clockwise in FIG. 1.

The intermediate transfer belt 8 is interposed between the photoconductors 1Y, 1M, 1C, and 1K and the four primary transfer rollers 9Y, 9M, 9C, and 9K disposed inside the loop of the intermediate transfer belt 8. The outer circumferential surface of the intermediate transfer belt 8 contacts the photoconductors 1Y, 1M, 1C, and 1K to form primary transfer nips for transferring a yellow toner image, a magenta toner image, a cyan toner image, and a black toner image. Power supplies each apply primary transfer bias having a polarity opposite to a normal polarity of the toner to each of the primary transfer rollers 9Y, 9M, 9C, and 9K.

The intermediate transfer belt 8 is interposed between the secondary-transfer backup roller 12 disposed inside the loop of the intermediate transfer belt 8 and a secondary transfer roller 18 disposed outside the loop. The outer circumferential surface of the intermediate transfer belt 8 contacts the secondary transfer roller 18 to form a secondary transfer nip.

A power supply applies a secondary transfer bias having the polarity opposite to the normal polarity of the toner to the secondary transfer roller 18. Instead of the above-described configuration, the image forming apparatus 60 may include a sheet conveyance belt stretched over the secondary transfer roller 18, several support rollers, and a drive roller. In this case, the intermediate transfer belt 8 and the sheet conveying belt are interposed between the secondary transfer roller 18 and the secondary-transfer backup roller 12.

The belt cleaner 100 is disposed outside the loop of the intermediate transfer belt 8. The belt cleaner 100 includes a pre-cleaner **100*a*, a reversely charged toner cleaner 100*b*, and a normally charged toner cleaner 100*c*. The pre-cleaner 100*a* roughly removes toner of an untransferred toner image on the intermediate transfer belt 8. The reversely charged toner cleaner 100*b* removes toner charged to the polarity opposite to the normal charge polarity of the toner on the intermediate transfer belt 8. In the present embodiment, the normal charge polarity is negative, and the polarity opposite to the normal charge polarity is positive. The normally charged toner cleaner 100*c* removes toner charged to the normal charge polarity on the intermediate transfer belt 8. The above-described order arranging the pre-cleaner 100*a*, the reversely charged toner cleaner 100*b*, and the normally charged toner cleaner 100*c*** is merely an example, and the pre-cleaner, the normally charged toner cleaner, and the reversely charged toner cleaner may be arranged in this order.

Each of the pre-cleaner **100*a*, the reversely charged toner cleaner 100*b*, and the normally charged toner cleaner 100*c* includes a cleaning brush roller 101, a collection roller 102, and a scraping blade 103. The collection roller 102 collects toner adhering to the cleaning brush roller 101. The scraping blade 103 comes into contact with the collection roller 102 and scrapes the toner from the surface of the collection roller 102**.

A voltage having the polarity (that is, the positive polarity) opposite to the normal charge polarity (that is, negative polarity) of the toner is applied to the cleaning brush rollers 101 in each of the pre-cleaner **100*a* and the normally charged toner cleaner 100*c* to electrostatically remove the normally charged toner on the intermediate transfer belt 8. A voltage having the positive polarity higher than that of the cleaning brush roller 101 is applied to the collection roller 102 in each of the pre-cleaner 100***a* and the normally charged toner cleaner 100*c* to electrostatically collect the normally charged toner adhering to the cleaning brush roller 101.

A voltage having the normal polarity of the toner (that is, the negative polarity) is applied to the cleaning brush rollers 101 in the reversely charged toner cleaner 100*b* to electrostatically remove the reversely charged toner on the intermediate transfer belt 8. A voltage having the negative polarity higher than that of the cleaning brush roller 101 is applied to the collection roller 102 in the reversely charged toner cleaner 100*b* to electrostatically collect the reversely charged toner adhering to the cleaning brush roller 101.

The three cleaning backup rollers 13, 14, and 15 is inside the loop of the intermediate transfer belt 8, and the cleaning brush roller 101 is in each of the pre-cleaner 100*a*, the reversely charged toner cleaner 100*b*, and the normally charged toner cleaner 100*c*. The intermediate transfer belt 8 is interposed between the cleaning brush rollers 101 and the three cleaning backup rollers 13, 14, and 15. The outer circumferential surface of the intermediate transfer belt 8 contacts the cleaning brush rollers 101 in the pre-cleaner 100*a*, the reversely charged toner cleaner 100*b*, and the normally charged toner cleaner 100*c* to form cleaning nips.

The lubrication device 200 applies lubricant to the surface of the intermediate transfer belt 8 in order to protect the surface of the intermediate transfer belt 8. The lubrication device 200 includes a solid lubricant 202 such as a lump of zinc stearate, and an application brush roller 201 serving as an application member. The application brush roller 201 contacts the solid lubricant 202 and rotates to scrape the solid lubricant 202 and apply lubricant powder obtained by scraping the solid lubricant 202 to the surface of the intermediate transfer belt 8.

The image forming apparatus 60 includes a sheet feeder 30 including a sheet tray 31 and a sheet feed roller 32. The sheet tray 31 contains the sheet P as a recording medium. The sheet feed roller 32 feeds the sheet P from the sheet tray 31 to a feeding path. The image forming apparatus 60 also includes a registration roller pair 33 disposed on the right of the secondary transfer nip in FIG. 1. The registration roller pair 33 receives the sheet P fed from the sheet feeder 30 and timely forwards the sheet P to the secondary transfer nip.

The image forming apparatus 60 includes a fixing device 40 disposed on the left of the secondary transfer nip in FIG. 1. The fixing device 40 includes a heating roller 41 and a pressure roller 42. The fixing device 40 receives the sheet P sent from the secondary transfer nip and performs a fixing process that fixes the toner image onto the sheet P.

The image forming apparatus 60 includes a bottle storage portion 50 disposed in the upper right in the optical writing unit 20 in FIG. 1. The bottle storage portion 50 stores toner bottles 51Y, 51M, 51C, and 51K. Yellow toner, magenta toner, cyan toner, and black toner are stored in the toner bottles 51Y, 51M, 51C, and 51K, respectively. The toner is supplied to each of the developing devices 5Y, 5M, 5C, and 5K if supplying toner is needed.

In response to receiving image data sent from a personal computer, a controller in the image forming apparatus 60 controls the driver to drive and rotate the drive roller 11, and the intermediate transfer belt 8 starts rotating. Rotating the intermediate transfer belt 8 rotates the rollers inside the loop of the intermediate transfer belt 8 other than the drive roller 11. At the same time, the photoconductors 1Y, 1M, 1C, and 1K in the process units 6Y, 6M, 6C, and 6K start rotating. The charging devices 2Y, 2M, 2C, and 2K uniformly charge the surfaces of the photoconductors 1Y, 1M, 1C, and 1K, respectively. The optical writing unit 20 emits the laser beams L to irradiate the surfaces of the photoconductors 1Y, 1M, 1C, and 1K to form electrostatic latent images on the surfaces.

The developing devices 5Y, 5M, 5C, and 5K develop the electrostatic latent images formed on the surfaces of the photoconductors 1Y, 1M, 1C, and 1K to obtain the yellow toner image, the magenta toner image, the cyan toner image, and the black toner image on the surfaces of the photoconductors 1Y, 1M, 1C, and 1K, respectively. In the primary transfer nips, the yellow toner image, the magenta toner image, the cyan toner image, and the black toner image are transferred and superimposed one on another on the intermediate transfer belt 8. As a result, a four-color superimposed toner image is formed on the outer circumferential surface of the intermediate transfer belt 8.

Meanwhile, in the sheet feeder 30, the sheet feed roller 32 feeds the sheets P from the sheet tray 31 one by one to the registration roller pair 33. The registration roller pair 33 sends the sheet P to the secondary transfer nip at a timing to synchronize with the four-color toner image formed on the intermediate transfer belt 8 to secondarily transfer the four-color toner image onto the sheet P. Thus, a multicolor toner image is formed on the sheet P. The sheet P bearing the multicolor image is conveyed from the secondary transfer nip to the fixing device 40, and the fixing device 40 performs a fixing process to fix the toner image onto the sheet P.

After the yellow, magenta, cyan and black toner images are primarily transferred to the intermediate transfer belt 8, the drum cleaners 4Y, 4M, 4C, and 4K remove residual toner that is not transferred to the intermediate transfer belt 8 and remains on the photoconductors 1Y, 1M, 1C, and 1K. Further, discharge lamps removes residual potentials from the photoconductors 1Y, 1M, 1C, and 1K, and the charging devices 2Y, 2M, 2C, and 2K uniformly charge the photoconductors 1Y, 1M, 1C, and 1K, respectively, as preparation for subsequent image formation. The belt cleaner 100 removes residual toner that is not transferred to the sheet P and remains on the intermediate transfer belt 8.

Figure 2:
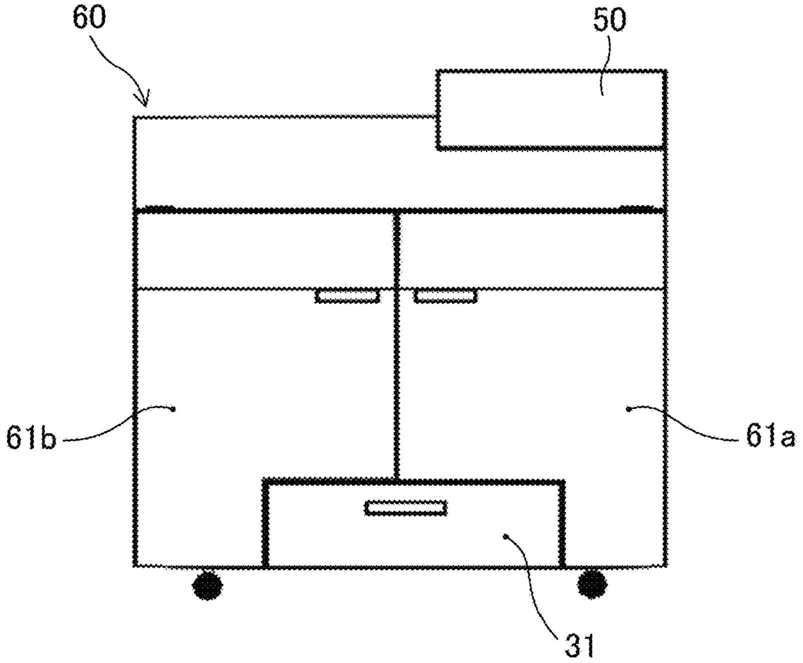
FIG. 2 is a front view of an exterior of the image forming apparatus illustrated in FIG. 1.

FIG. 2 is a front view of an exterior of the image forming apparatus 60.

As illustrated in FIG. 2, the image forming apparatus 60 includes a pair of front doors 61*a* and 61*b* each serving as a door to open and close an opening 60*a* of the body of the image forming apparatus 60. In other words, the front doors 61*a* covers the opening 60*a* at a door closed position as a first closed position. The front door 61*a* on the right side in FIG. 2 is rotatably attached to the right end of the body of the image forming apparatus 60 in FIG. 2 by a hinge. The front door 61*b* on the left side in FIG. 2 is rotatably attached to the left end of the body of the image forming apparatus 60 in FIG. 2 by a hinge. The front doors 61*a* and 61*b* form double doors to open and close the opening 60*a* of the body of the image forming apparatus 60.

Figure 3:
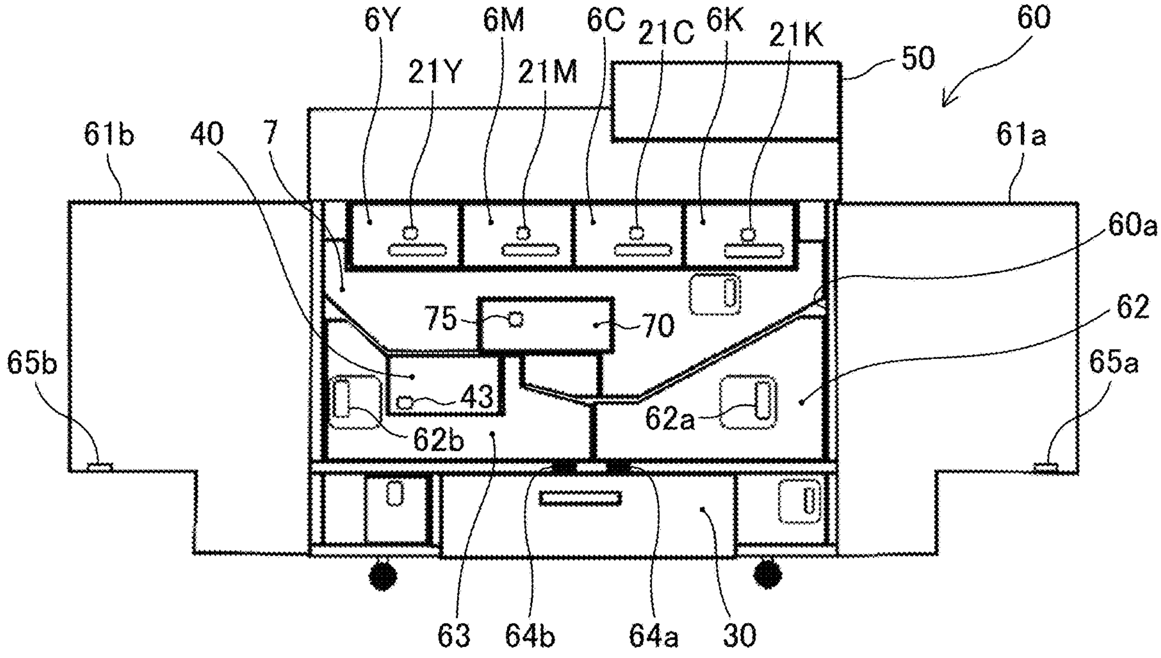
FIG. 3 is a front view of an exterior of the image forming apparatus opening a pair of front doors.

FIG. 3 is a front view of an exterior of the image forming apparatus 60 opening the pair of front doors 61*a* and 61*b*.

As illustrated in FIG. 3, opening the pair of front doors 61*a* and 61*b* exposes the process units 6Y, 6M, 6C, and 6K, the transfer unit 7, the fixing device 40, a sheet conveyance section 62, and a sheet ejection section 63. The sheet conveyance section 62 conveys the sheet P sent from the sheet feeder 30 toward the secondary transfer roller 18. The sheet ejection section 63 conveys the sheet P having passed through the fixing device 40 and ejects the sheet P to the outside of the image forming apparatus 60.

The process units 6Y, 6M, 6C, and 6K includes lock mechanisms 21Y, 21M, 21C, and 21K, respectively. Opening a lock of the lock mechanism on the process unit enables a service person in front of the image forming apparatus to attach the process unit to the image forming apparatus and detach the process unit from the image forming apparatus. Each of the process units 6Y, 6M, 6C, and 6K may be configured to be capable of being pulled out from the body of the image forming apparatus 60 to replace components of the process units such as the photoconductors 1Y, 1M, 1C, and 1K, the charging devices 2Y, 2M, 2C, and 2K, the developing devices 5Y, 5C, 5M, and 5K, and drum cleaners 4Y, 4M, 4C, and 4K.

The fixing device 40 also includes a lock mechanism 43 to lock the fixing device 40 to the body of the image forming apparatus 60. Opening the lock mechanism 43 enables an operator in front of the image forming apparatus 60 to attach the fixing device 40 to the image forming apparatus 60 and detach the fixing device 40 from the image forming apparatus 60. The fixing device 40 may be mounted on the sheet ejection section 63. In this case, the fixing device 40 is attached to and detached from the image forming apparatus 60 by pulling out the sheet ejection section 63 from the body of the image forming apparatus 60 and lifting the fixing device 40.

Figure 20:
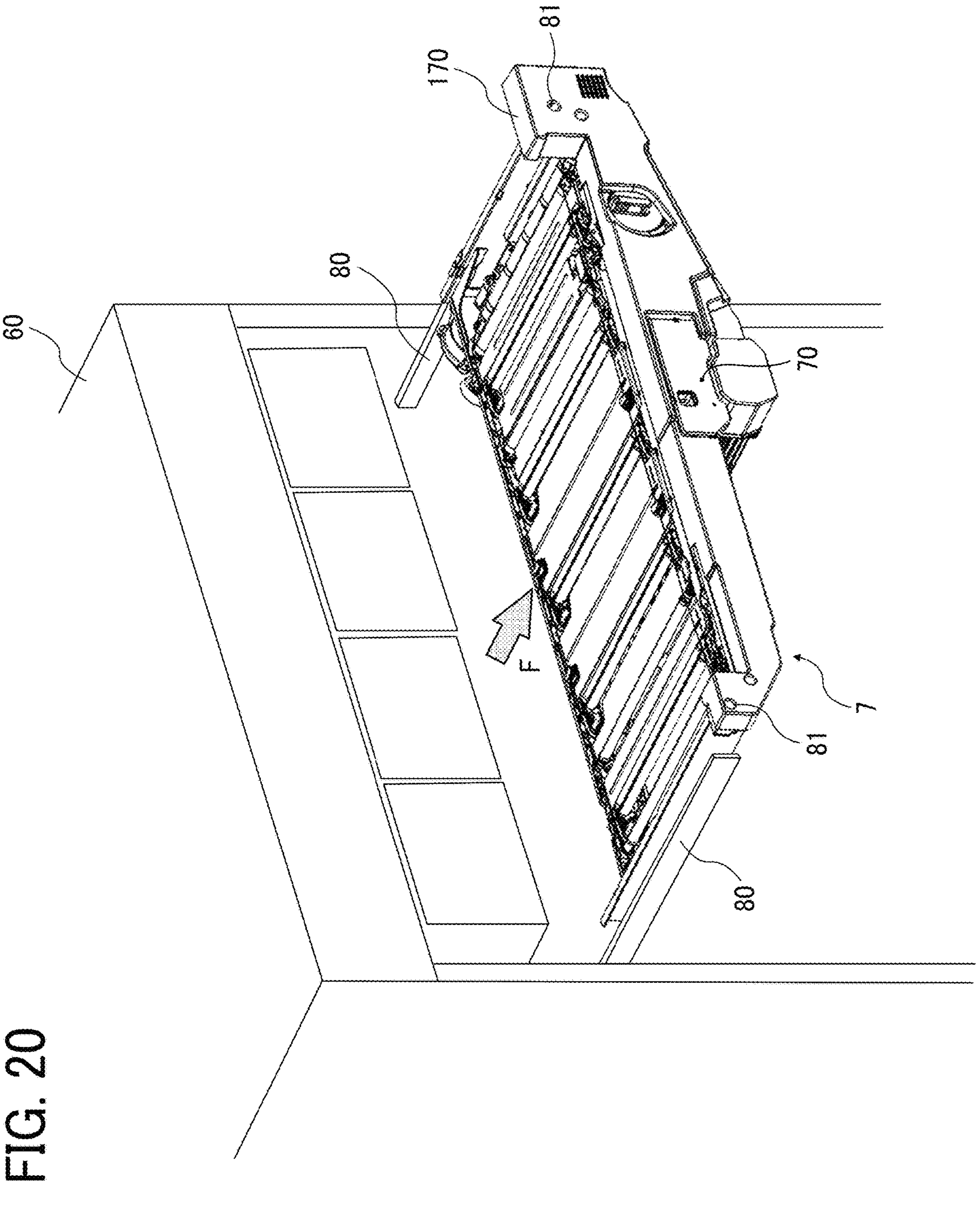
FIG. 20 is a perspective view of the transfer unit as a drawer unit and slide rails fixed to the image forming apparatus.

The transfer unit 7 serving as the drawer unit is configured to be capable of being pulled out from the body of the image forming apparatus but is screwed to the body of the image forming apparatus so that the transfer unit 7 cannot be pulled out except for work by a service person, such as maintenance. An example of a configuration that enables the drawer unit to be pulled out is as follows. FIG. 20 is a perspective view of the transfer unit 7 and slide rails 80. The slide rails 80 are fixed to the body of the image forming apparatus 60. Each of slide rails 80 includes one side, the other side, and rollers or bearings between the one side and the other side. The one sides of the slide rails 80 are fixed on both side plates of the body of the image forming apparatus 60, and the other sides of the slide rails 80 are fixed on both side plates of the transfer unit 7 as the drawer unit. Thus, the slide rails enable pulling out the drawer unit from the body of the image forming apparatus in a direction indicated by an arrow F in FIG. 20. The transfer unit 7 has screw holes 81 at both end portions of the front frame 170 in a lateral direction of the front frame 170. Screws are inserted into the screw holes 81, respectively to fix the transfer unit 7 as the drawer unit to the body to the image forming apparatus 60. Alternatively, the drawer unit may be placed on a guide disposed in the image forming apparatus and may be pulled out by sliding on a support plate in the body of the image forming apparatus along the guide.

The sheet conveyance section 62 and the sheet ejection section 63 are provided so as to be pulled out from the body of the image forming apparatus. When a sheet jam occurs in the sheet conveyance section 62, opening the lock of the lock mechanism 62*a* that fixes the sheet conveyance section 62 to the body of the image forming apparatus 60 enables pulling out the sheet conveyance section 62 from the body of the image forming apparatus 60 and removing the jammed sheet. When a sheet jam occurs in the sheet ejection section 63, opening the lock of the lock mechanism 63*b* that fixes the sheet ejection section 63 to the body of the image forming apparatus 60 enables pulling out the sheet ejection section 63 from the body of the image forming apparatus 60 and removing the jammed sheet.

Figure 5A:
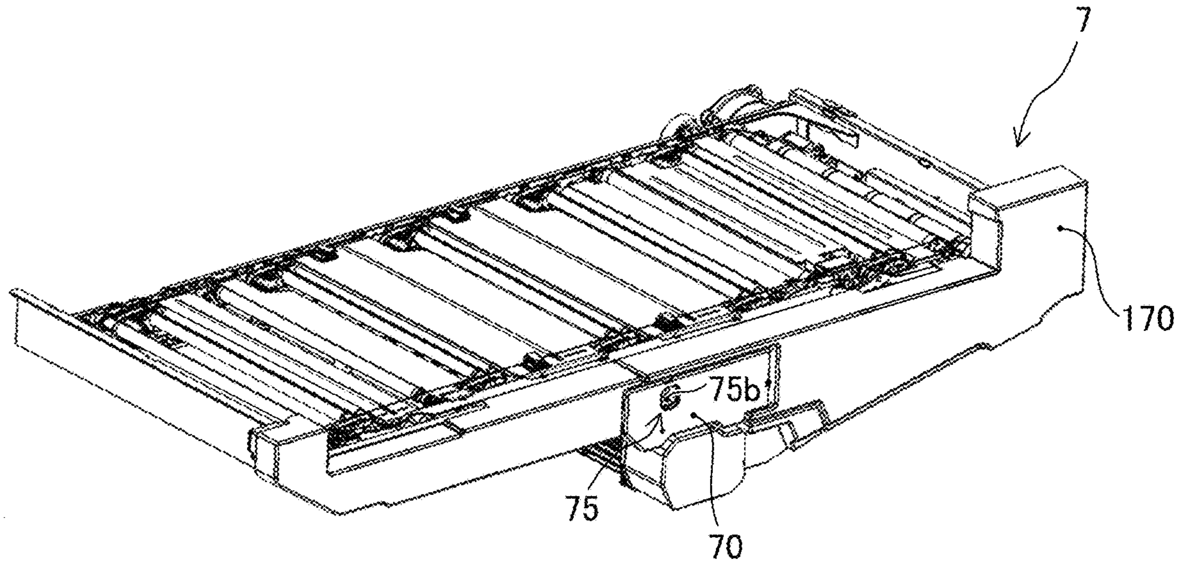
FIG. 5A is a perspective view of a transfer unit including a small transfer door that is closed.
Figure 5B:
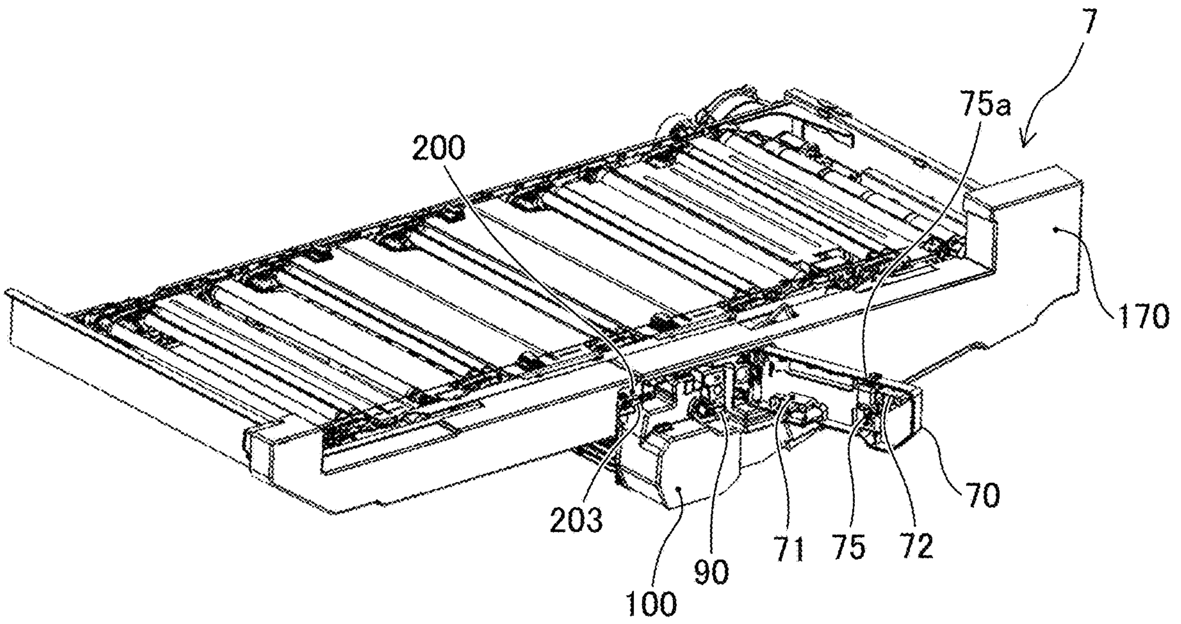
FIG. 5B is a perspective view of the transfer unit including the small transfer door that is opened.

The belt cleaner 100 is detachably attached to the transfer unit 7. Separately, the lubrication device 200 is detachably attached to the transfer unit 7. The transfer unit 7 includes a small transfer door 70 serving as a cover. As illustrated in FIGS. 5A and 5B, the closed small transfer door 70 covers an upper portion of the belt cleaner 100 and the lubrication device 200.

Interlock switches 64*a* and 64*b* are disposed substantially at the center of the lower end of the opening 60*a* of the image forming apparatus in a lateral direction in FIG. 3. At the lower ends of the front doors 61*a* and 61*b*, projections 65*a* and 65*b* are disposed to turn on the interlock switches 64*a* and 64*b*, respectively. Closing the front doors 61*a* and 61*b* to closed positions causes the projections 65*a* and 65*b* to push the interlock switches 64*a* and 64*b*. As a result, the interlock switches 64*a* and 64*b* are turned on.

Figure 4:
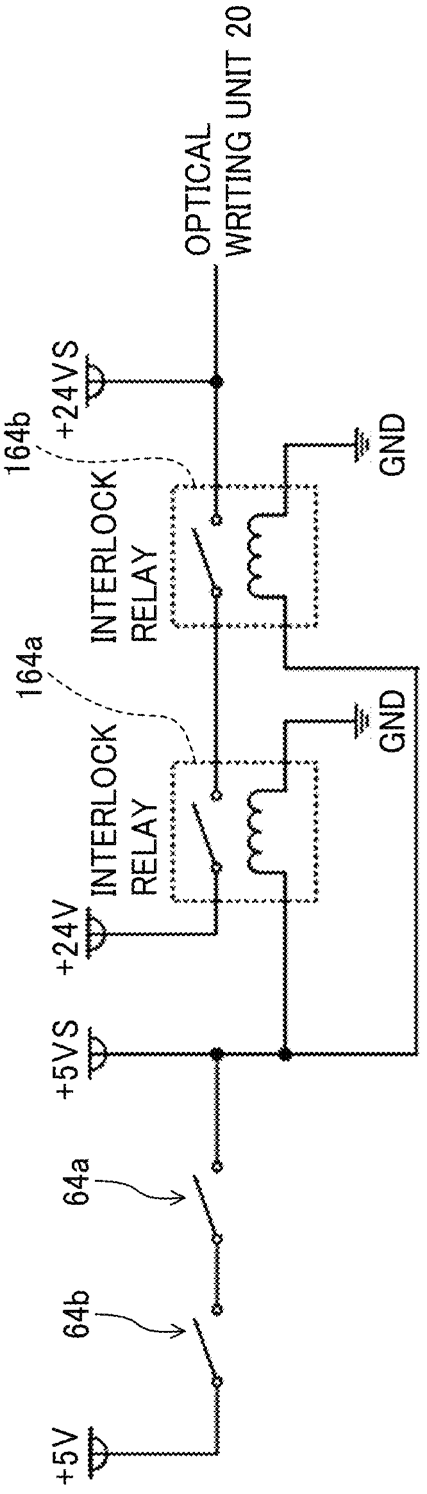
FIG. 4 is a circuit diagram of an electronic circuit including interlock switches to turn on and off the electronic circuit.

FIG. 4 is a circuit diagram including the interlock switches 64*a* and 64*b*. The interlock switches 64*a* and 64*b* turn on and off an electronic circuit.

As illustrated in FIG. 4, the interlock switches 64*a* and 64*b* are disposed in the electronic circuit that supplies power to the relay switches 164*a* and 164*b*. Closing both the front doors 61*a* and 61*b* turns on the interlock switches 64*a* and 64*b*. As a result, the power is supplied to the relay switches 164*a* and 164*b*, and the relay switches 164*a* and 164*b* are turned on. The power is supplied to the optical writing unit 20, and the optical writing unit can irradiate the surfaces of the photoconductors 1Y, 1M, 1C, and 1K with the laser beams L.

In contrast, opening one of the two front doors 61*a* and 61*b* turns off one of the interlock switches 64*a* and 64*b*, which stops supplying the power to the relay switches 164*a* and 164*b*. The relay switches 164*a* and 164*b* are turned off to stop supplying the power to the optical writing unit 20. As a result, the optical writing unit 20 cannot irradiate the surfaces of the photoconductors 1Y, 1M, 1C, and 1K with the laser beams L.

Figure 6A:
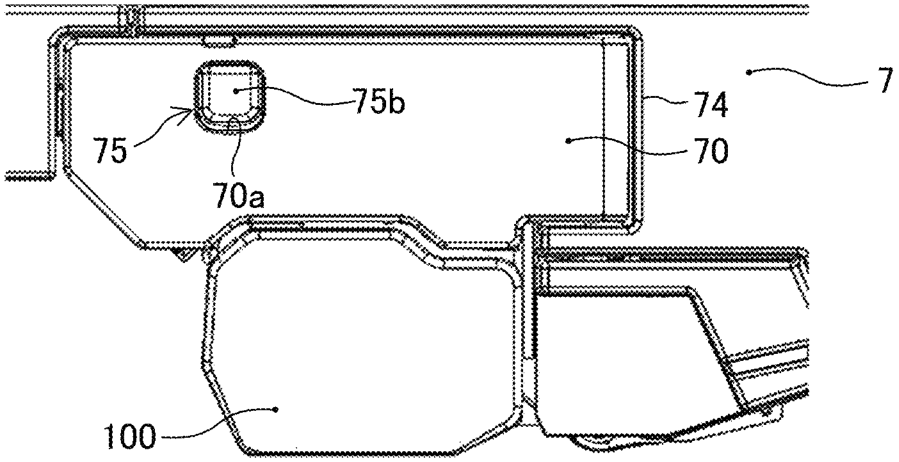
FIG. 6A is an enlarged front view of the small transfer door that is closed and the periphery of the small transfer door.
Figure 6B:
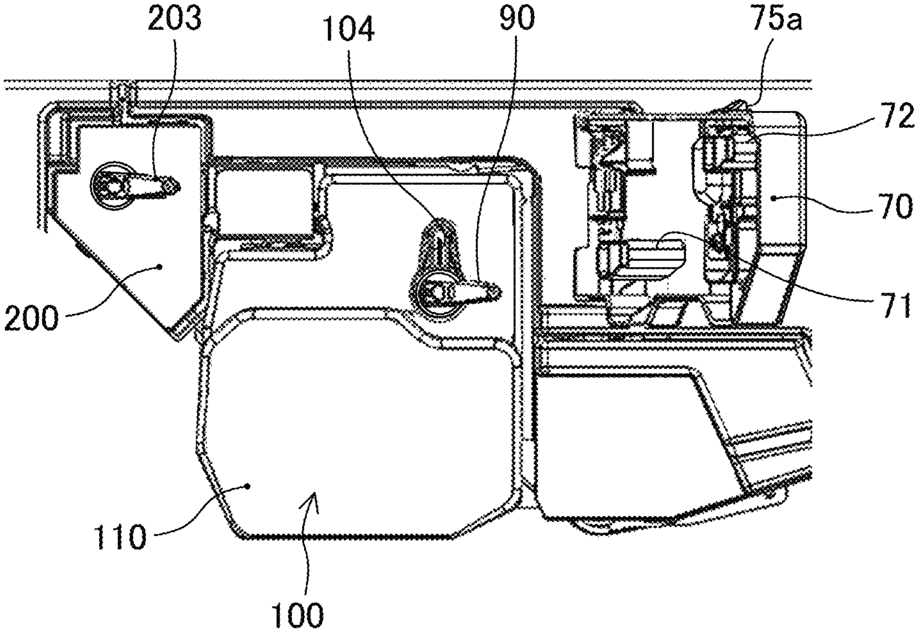
FIG. 6B is an enlarged front view of the small transfer door that is opened and the periphery of the small transfer door.
Figure 7:
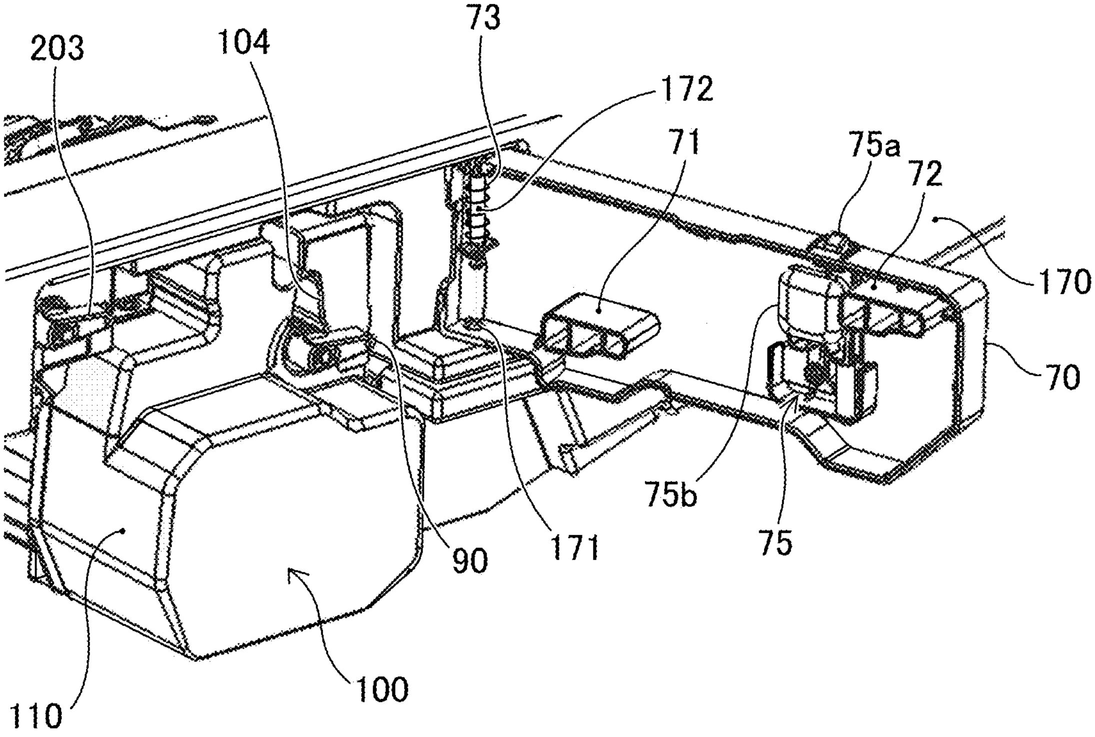
FIG. 7 is an enlarged perspective view of the small transfer door that is opened and the periphery of the small transfer door.

FIG. 5A is a perspective view of the transfer unit 7 including the small transfer door 70 that is closed, and FIG. 5B is a perspective view of the transfer unit 7 including the small transfer door 70 that is opened. FIG. 6A is an enlarged front view of the small transfer door that is closed and the periphery of the small transfer door, and FIG. 6B is an enlarged front view of the small transfer door that is opened and the periphery of the small transfer door. FIG. 7 is an enlarged perspective view of the small transfer door 70 that is opened and the periphery of the small transfer door 70.

As illustrated in FIG. 7, the transfer unit 7 includes a front frame 170, a support projection 171, and a support shaft 172. The support projection 171 and the support shaft 172 are disposed on the front frame 170 and rotatably support the small transfer door 70. In addition, a torsion spring 73 serving as a biasing member is attached to the support shaft 172 to urge the small transfer door 70 in an opening direction in which the small transfer door 70 opens.

The small transfer door 70 includes a lock 75 to lock the small transfer door 70 at a closed position illustrated in FIG. 5A. Hereinafter, the closed position of the small transfer door 70 is referred to as a second closed position to clearly differentiate the closed position of the front door from the closed position of the small transfer door 70. The lock 75 is attached to the small transfer door 70 so as to be movable within a predetermined range in the vertical direction, and a biasing member such as a spring biases the lock 75 vertically upward. As illustrated in FIG. 6A, the lock 75 has an operation portion 75*b* recessed inward for the user to operate the lock 75. The small transfer door 70 has an opening 70*a*. The operation portion 75*b* is exposed from the opening 70*a*.

As illustrated in FIG. 7, the lock 75 includes a claw 75*a* at an upper portion of the lock 75, and the claw 75*a* projects from the upper face of the small transfer door 70. When the small transfer door 70 is closed, the claw 75*a* of the lock 75 is upstream from the front frame 170 of the transfer unit 7 in the opening direction in which the small transfer door 70 opens and faces the front frame 170. In other words, the small transfer door 70 covers the belt cleaner 100 and the lubrication device 200 that are at their mounting positions. Thus, the small transfer door 70 is locked at the second closed position.

When the user opens the small transfer door 70, the user inserts his or her finger into the operation portion 75*b* of the lock 75 through the opening 70*a* of the small transfer door 70 and pushes the lock 75 downward against a biasing force of the spring. As a result, the lock 75 moves downward, and the claw 75*a* of the lock 75 is retracted from the upper face of the small transfer door 70. Since the lock does not face and contact the front frame 170 of the transfer unit 7, the small transfer door 70 is unlocked. After the small transfer door 70 is unlocked, the biasing force of the torsion spring 73 rotates the small transfer door 70 to move the small transfer door 70 to an opening position as illustrated in FIGS. 5B, 6B, and 7. The small transfer door 70 rotated to the opening position by the biasing force of the torsion spring 73 butts a stopper 74 disposed on the transfer unit 7. The stopper 74 stops the rotation by the biasing force of the torsion spring 73. In other words, the stopper 74 stops the small transfer door 70 as the cover forced by the torsion spring 73 at the opening position. The small transfer door 70 remains at the opening position. The small transfer door 70 at the opening position contacts a contact portion of the front door 61*a* to restrict the movement of the door 61*a* to the first closed position. The stopper 74 is a side wall of a recess disposed in the front frame 170 of the transfer unit 7, and the small transfer door 70 is in the recess.

As illustrated in FIGS. 5B, 6B, and 7, the transfer unit 7 includes a cleaning lock lever 90 to lock the belt cleaner 100 as a detachable unit in the transfer unit 7.

The belt cleaner 100 includes a front cleaning cover 110 having a relief hole 104 to avoid contact between the cleaning lock lever 90 and the front cleaning cover 110. A part of the front cleaning cover 110 faces a contact and separation mechanism 120 (see FIG. 11). The contact and separation mechanism 120 moves the three cleaning backup rollers 13, 14, and 15 to bring the three cleaning backup rollers 13, 14, and 15 into contact with corresponding cleaning brush rollers or separate the three cleaning backup rollers 13, 14, and from the corresponding cleaning brush rollers.

Figure 8:
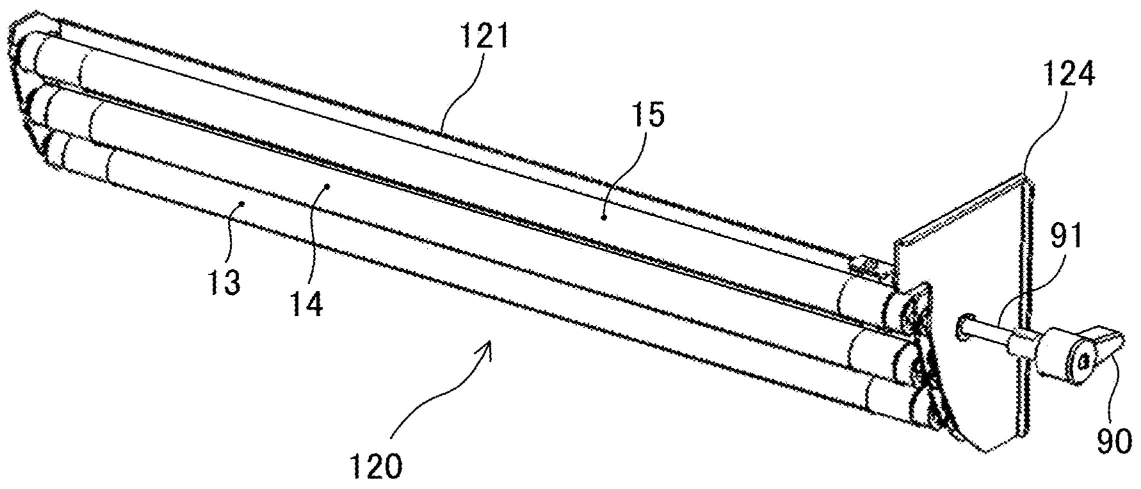
FIG. 8 is a perspective view of a contact and separation mechanism.
Figure 9:
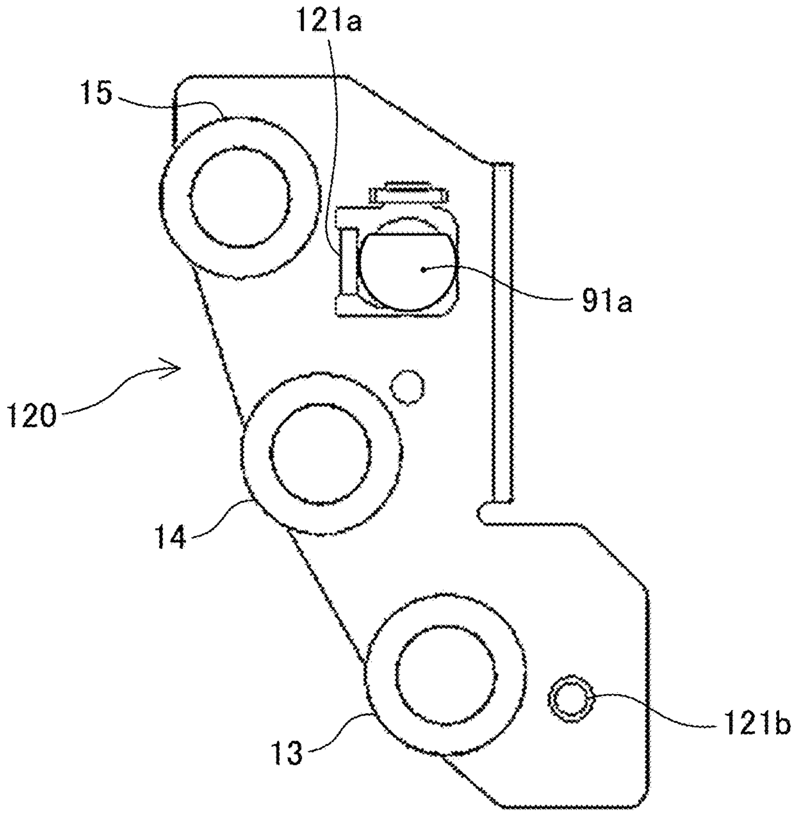
FIG. 9 is a schematic cross-sectional view of the contact and separation mechanism.
Figure 10:
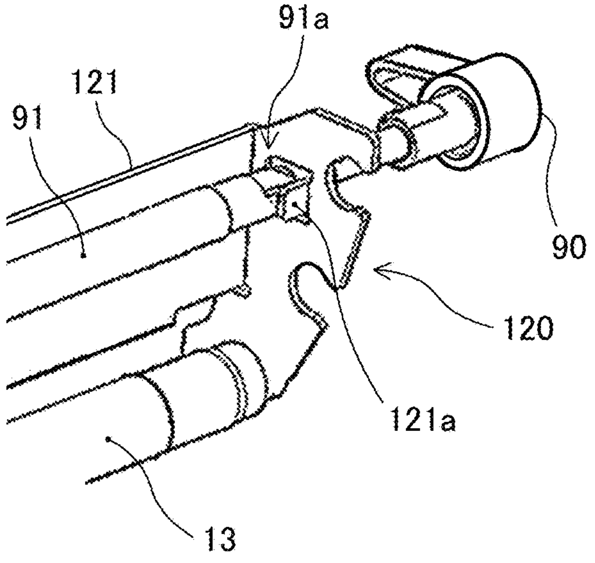
FIG. 10 is an enlarged perspective view of a main part of the contact and separation mechanism.

FIG. 8 is a perspective view of the contact and separation mechanism 120, FIG. 9 is a schematic cross-sectional view of the contact and separation mechanism 120, and FIG. 10 is an enlarged perspective view of a main part of the contact and separation mechanism 120.

As illustrated in FIG. 8, the contact and separation mechanism 120 includes a support frame 121 that rotatably supports the three cleaning backup rollers 13, 14, and 15. The support frame 121 rotatably supports a rotary shaft 91 having one end to which the cleaning lock lever 90 is attached. As illustrated in FIGS. 9 and 10, the rotary shaft 91 has a cam portion 91*a* having a D-shaped cross section, and the support frame 121 has a cam contact portion 121*a* with which the cam portion 91*a* comes into contact.

The support frame 121 has side plates at both ends in a longitudinal direction of the support frame 121. As illustrated in FIG. 9, the side plate includes a support shaft 121*b*. The transfer unit 7 includes side plates 124 at both ends in the longitudinal direction. The side plates 124 rotatably support the support shafts 121*b*. FIG. 8 illustrates the side plate 124 at the front side of the transfer unit 7.

Figure 11A:
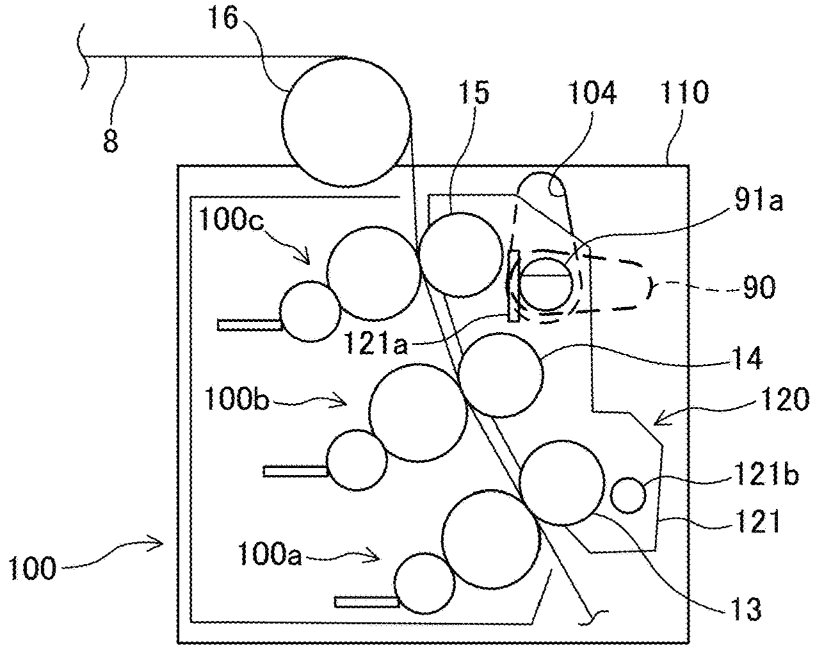
FIG. 11A is a diagram illustrating three cleaning backup rollers contacting corresponding cleaning brush rollers via an intermediate transfer belt.
Figure 11B:
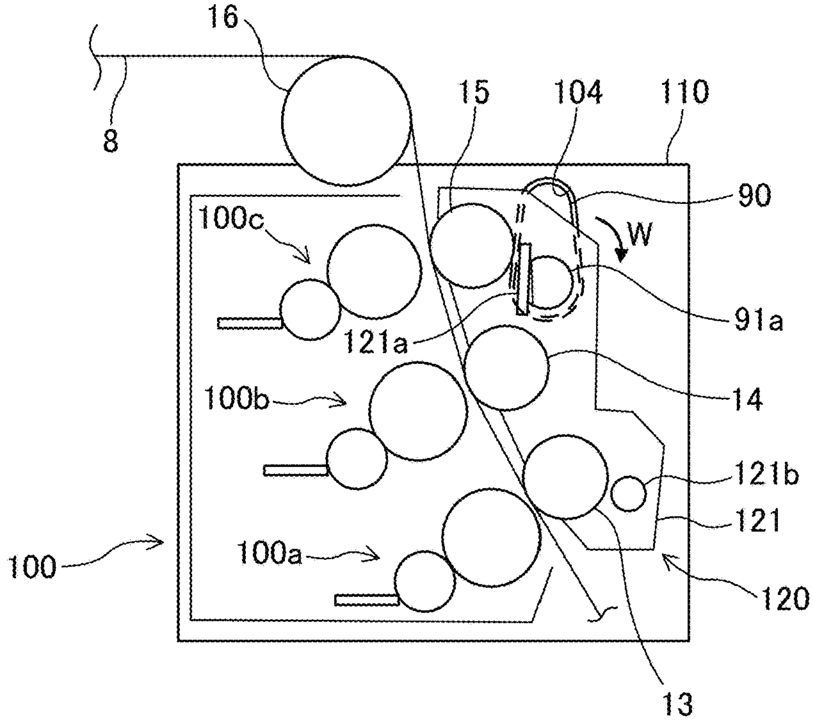
FIG. 11B is a diagram illustrating the three cleaning backup rollers separated from the corresponding cleaning brush rollers.

FIG. 11A is a diagram illustrating the three cleaning backup rollers 13, 14, and 15 contacting the corresponding cleaning brush rollers via the intermediate transfer belt 8. FIG. 11B is a diagram illustrating the three cleaning backup rollers 13, 14, and 15 separated from the corresponding cleaning brush rollers.

In FIG. 11A, the cleaning lock lever 90 is at a lock position, and the belt cleaner 100 is locked to the transfer unit 7. As illustrated in FIG. 11A, an arc-shaped portion of the cam portion 91*a* of the rotary shaft 91 contacts the cam contact portion 121*a*. The three cleaning backup rollers 13, 14, and 15 are in contact with the corresponding cleaning brush rollers via the intermediate transfer belt 8 to form cleaning nips.

A tip of the cleaning lock lever 90 at the lock position faces the front cleaning cover 110 (see FIGS. 5B and 6B). Butting the front cleaning cover 110 with the tip of the cleaning lock lever 90 prevents the belt cleaner 100 from drawing from the transfer unit 7. The belt cleaner 100 is locked to a mounting position inside the transfer unit 7. In other words, the belt cleaner 100 is detachably attached to the body from the opening 60*a* and disposed at the mounting position inside the body.

As illustrated in FIG. 11B, rotating the cleaning lock lever 90 counterclockwise by 90° in FIG. 11B positions the cleaning lock lever 90 at an unlock position. At the unlock position, the cleaning lock lever 90 faces the relief hole 104. As a result, the belt cleaner 100 is unlocked and can be removed.

Positioning the cleaning lock lever 90 at the unlock position causes the flat portion of the cam portion 91*a* to face the cam contact portion 121*a*. Then, tension of the intermediate transfer belt 8 rotates the contact and separation mechanism 120 about the support shaft 121*b* as a fulcrum in a direction indicated by an arrow W in FIG. 11B, and the cam contact portion 121*a* contacts a flat portion of the cam portion 91*a*. The above-described rotation of the contact and separation mechanism 120 separates the cleaning backup rollers 13, 14, and 15 from the corresponding cleaning brush rollers and separates the intermediate transfer belt 8 from the three cleaning brush rollers of the belt cleaner 100. In other words, the contact and separation mechanism 120 separates the intermediate transfer belt 8 from the cleaning brush rollers in conjunction with a movement of the cleaning lock lever 90 from the lock position to the unlock position of the cleaning lock lever 90. Separating the cleaning backup rollers 13, 14, and 15 and the intermediate transfer belt 8 from the three cleaning brush rollers prevents the three cleaning brush rollers of the belt cleaner 100 from rubbing against the intermediate transfer belt 8 when the belt cleaner 100 is attached to or detached from the transfer unit 7. Accordingly, the surface of the intermediate transfer belt 8 is prevented from being damaged when the belt cleaner 100 is attached to or detached from the transfer unit 7.

If a locking operation of the cleaning lock lever 90 to lock the belt cleaner 100 is not interlocked with the contact and separation operation of the contact and separation mechanism 120, the following disadvantages occur. After the lock of the belt cleaner 100 is unlocked, rotating the contact and separation mechanism 120 is needed to separate the cleaning backup rollers 13, 14, and 15 from the corresponding cleaning brush rollers. When the belt cleaner 100 is attached to or detached from the transfer unit 7, operations are complicated. Further, after the lock of the belt cleaner 100 is unlocked, the contact and separation operation of the contact and separation mechanism 120 may be forgotten. As a result, the surface of the intermediate transfer belt 8 may be damaged when the belt cleaner 100 is attached to or detached from the transfer unit 7.

In contrast, the locking operation of the cleaning lock lever 90 to lock the belt cleaner 100 in the present embodiment is interlocked with the contact and separation operation of the contact and separation mechanism 120. As a result, the operations when the belt cleaner 100 is attached to or detached from the transfer unit 7 are simplified. In addition, when the belt cleaner 100 is attached to or detached from the transfer unit 7, the above-described configuration in the present embodiment can always position the cleaning backup rollers 13, 14, and 15 away from the corresponding cleaning brush rollers and prevent the damage of the surface of the intermediate transfer belt 8.

As illustrated in FIGS. 5B and 6B, the lubrication device 200 as the detachable unit includes a lubrication device lock lever 203 to lock the lubrication device 200 in the transfer unit 7. The lubrication device lock lever 203 is attached to a tip of a rotary shaft rotatably attached to the lubrication device 200. A lock claw is disposed on the rotary shaft. When the lubrication device lock lever 203 is at a rotation position illustrated in FIGS. 5B and 6B, the lock claw is disposed upstream from the front frame 170 in a direction in which the lubrication device 200 is drawn and faces the front frame 170 of the transfer unit 7. As a result, the lubrication device 200 is locked in the transfer unit 7.

Preferably, the above-described configuration is configured so that the contact and separation operation of the application brush backup roller 17 is performed in conjunction with a locking operation of the lubrication device lock lever 203. When the lubrication device 200 is attached to or detached from the transfer unit 7, the above-described configuration can position the application brush backup roller 17 at a separation position and separate the intermediate transfer belt 8 from the application brush roller 201. As a result, the above-described configuration can prevent the application brush roller 201 from rubbing against the intermediate transfer belt 8 and damaging the surface of the intermediate transfer belt 8 when the lubrication device 200 is attached to or detached from the transfer unit 7.

As illustrated in FIGS. 5B and 7, a first restricting member 71 is disposed on a back face of the small transfer door 70. If the cleaning lock lever 90 is not at the lock position, the first restricting member 71 contacts the cleaning lock lever 90 to prevent the small transfer door 70 from moving to a closing position at which the small transfer door is closed. In addition, a second restricting member 72 is disposed on the back face of the small transfer door 70. If the lubrication device lock lever 203 is not at a lock position illustrated in FIGS. 5B and 6B, the second restricting member 72 contacts the lubrication device lock lever 203 to prevent the small transfer door 70 from moving to the closing position.

Figure 12:
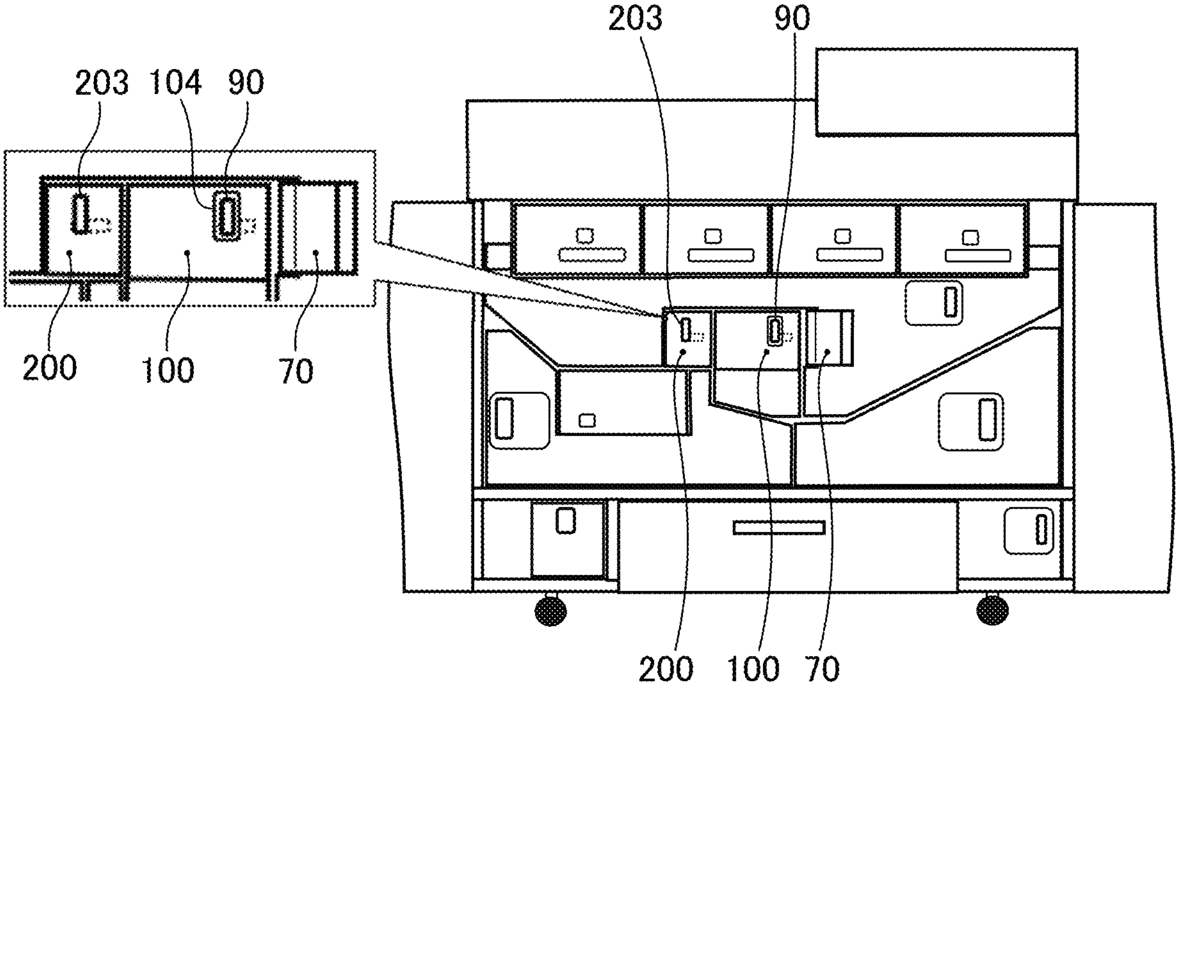
FIG. 12 is a front view of the exterior of the image forming apparatus opening the pair of front doors to illustrate a belt cleaner and a lubrication device that can be detachably attached to the transfer unit accommodated in a body of the image forming apparatus.

FIG. 12 is a front view of the exterior of the image forming apparatus opening the pair of front doors to illustrate the belt cleaner 100 and the lubrication device 200 that can be detachably attached to the transfer unit 7 accommodated in a body of the image forming apparatus 60.

In the present embodiment, the belt cleaner 100 and the lubrication device 200 disposed in the transfer unit 7 are independently attachable to and detachable from the transfer unit 7. When the belt cleaner 100 or the lubrication device 200 is removed, the small transfer door 70 is moved to the opening position to expose the belt cleaner 100 or the lubrication device 200. When the belt cleaner 100 is removed, rotating the cleaning lock lever 90 counterclockwise by 90° in FIG. 12 moves the cleaning lock lever 90 to the unlock position, and the cleaning lock lever 90 faces the relief hole 104 to avoid the contact between the cleaning lock lever 90 and the front cleaning cover 110. As a result, the belt cleaner 100 is unlocked and can be removed.

Pulling out the belt cleaner 100 to the front side of the image forming apparatus 60 causes the cleaning lock lever 90 to pass through the relief hole 104 of the front cleaning cover 110. As illustrated in FIGS. 11A and 11B, the belt cleaner 100 is disposed on the left side of the cleaning lock lever 90 in FIGS. 11A and 11B except for the front cleaning cover 110. No member other than the front cleaning cover 110 faces the cleaning lock lever 90. After the cleaning lock lever 90 passes through the relief hole 104 of the front cleaning cover 110, no member interferes removing the belt cleaner 100, and the belt cleaner 100 can be pulled out. As a result, the belt cleaner 100 can be removed from the image forming apparatus 60 independently of the transfer unit 7.

When the lubrication device 200 is removed, rotating the lubrication device lock lever 203 counterclockwise by 90° in FIG. 12 moves the lubrication device lock lever 203 to an unlock position, and the lubrication device lock lever 203 does not face the front frame 170 of the transfer unit 7 in the direction in which the lubrication device 200 is drawn, which unlock the lubrication device 200. As a result, the lubrication device 200 can be removed from the image forming apparatus 60 independently of the transfer unit 7.

Inserting the belt cleaner 100 to the mounting position positions the cleaning lock lever 90 on the front side of the relief hole 104 and enables rotating the cleaning lock lever 90 to lock the belt cleaner 100. If the belt cleaner 100 is not inserted to the mounting position, the cleaning lock lever 90 cannot be rotated to the lock position. The user can notice that the belt cleaner 100 is not correctly mounted.

If the lubrication device 200 is not properly mounted at the mounting position, the lock claw butts against the front frame 170 of the transfer unit 7, which restricts the rotation of the lubrication device lock lever 203. As a result, the user can notice that the lubrication device 200 is not correctly mounted.

Figure 13A:
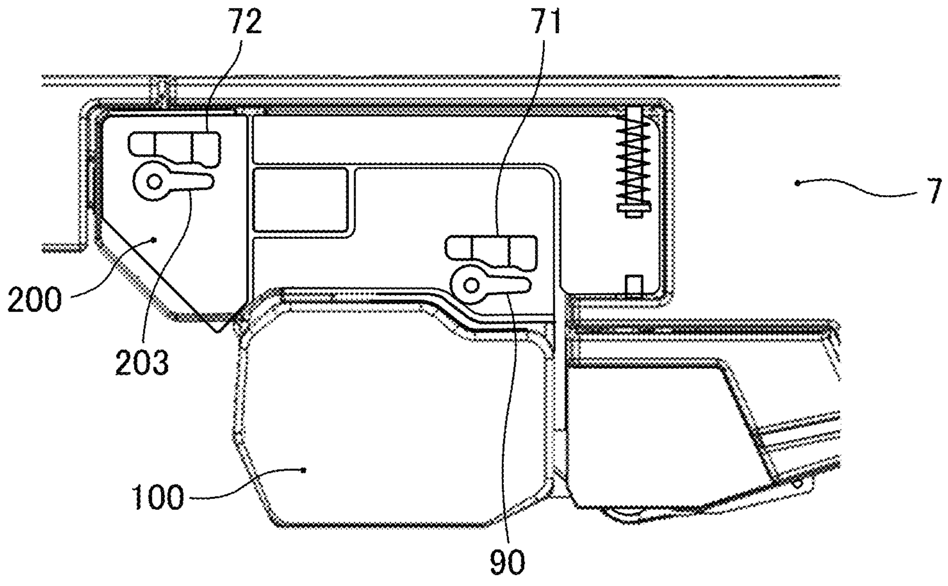
FIG. 13A is a view to illustrate lock levers at lock positions and restricting members on the closed small transfer door.
Figure 13B:
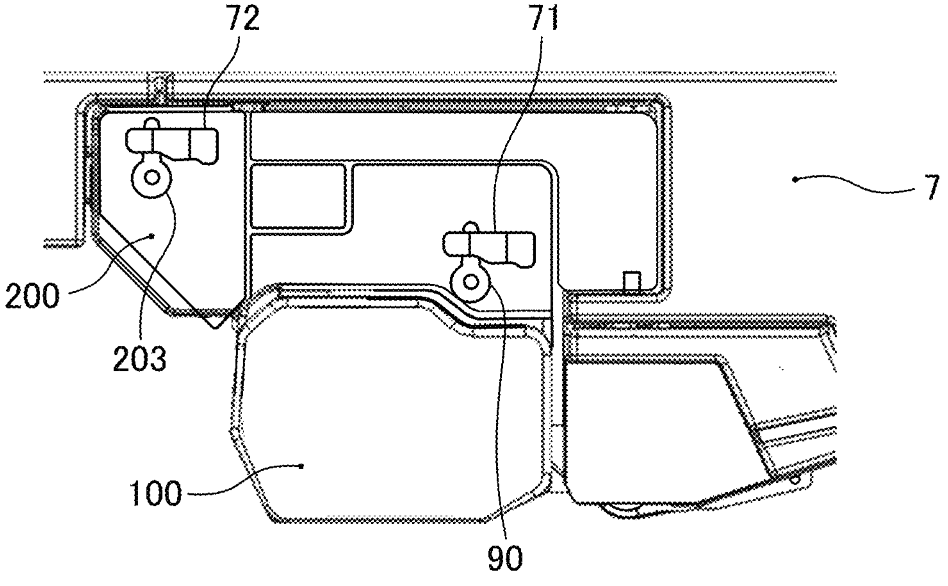
FIG. 13B is a view to illustrate lock levers at unlock positions and restricting members on the closed small transfer door.

FIG. 13A is a view to illustrate the cleaning lock lever 90 and the lubrication device lock lever 203 that are at the lock positions and the first restricting member 71 and the second restricting member 72 that are on the closed small transfer door 70. FIG. 13B is a view to illustrate the cleaning lock lever 90 and the lubrication device lock lever 203 that are at the unlock positions and the first restricting member 71 and the second restricting member 72 that are on the closed small transfer door 70.

As illustrated in FIG. 13A, positioning the cleaning lock lever 90 at the lock position prevents the first restricting member 71 from butting the cleaning lock lever 90, and positioning the lubrication device lock lever 203 at the lock position prevents the second restricting member 72 from butting the lubrication device lock lever 203. Accordingly, the small transfer door 70 can be closed.

In contrast, as illustrated in FIG. 13B, the cleaning lock lever 90 at the unlock position butts against the first restricting member 71 projecting from the inner face of the small transfer door 70. The cleaning lock lever 90 stops rotating the small transfer door 70 to the second closed position, and the small transfer door 70 is not closed. The lubrication device lock lever 203 at the unlock position butts against the second restricting member 72 projecting from the inner face of the small transfer door 70. The lubrication device lock lever 203 stops the rotation of the small transfer door 70 to the second closed position, and the small transfer door 70 is not closed. As a result, the user can notice that at least one of the belt cleaner 100 and the lubrication device 200 is not locked to the transfer unit 7.

If the image forming apparatus includes the first restricting member and the second restricting member disposed on the front door 61*a* or 61*b* and does not include the small transfer door 70, the following disadvantage may occur. For example, a large image forming apparatus used for commercial printing includes the front doors 61*a* and 61*b* that are large. The large front doors 61*a* and 61*b* have long rotation distances, which may increase the speeds of the front doors when the front doors are closed. In addition, the large front doors 61*a* and 61*b* have large weights. Butting the first restricting member and the second restricting member disposed on the large front door 61*a* or 61*b* against the lock lever to prevent the front doors 61*a* and 61*b* from being closed generates a large impact when the first restricting member or the second restricting member butts against the lock lever. As a result, the lock lever may be damaged or deformed, or a unit including the lock lever may be deformed or damaged.

In contrast, the image forming apparatus 60 according to the present embodiment includes the small transfer door 70. If the unit is not correctly installed in the image forming apparatus 60, the lock lever is not locked and butts the small transfer door 70, and the small transfer door 70 is not closed and butts the front door 61*a*. The above-described configuration can reduce a risk such as the deformation or the damage of the lock lever or the unit compared with the configuration including the restricting member on the front door 61*a* that butts the lock lever unlocked.

Figure 14:
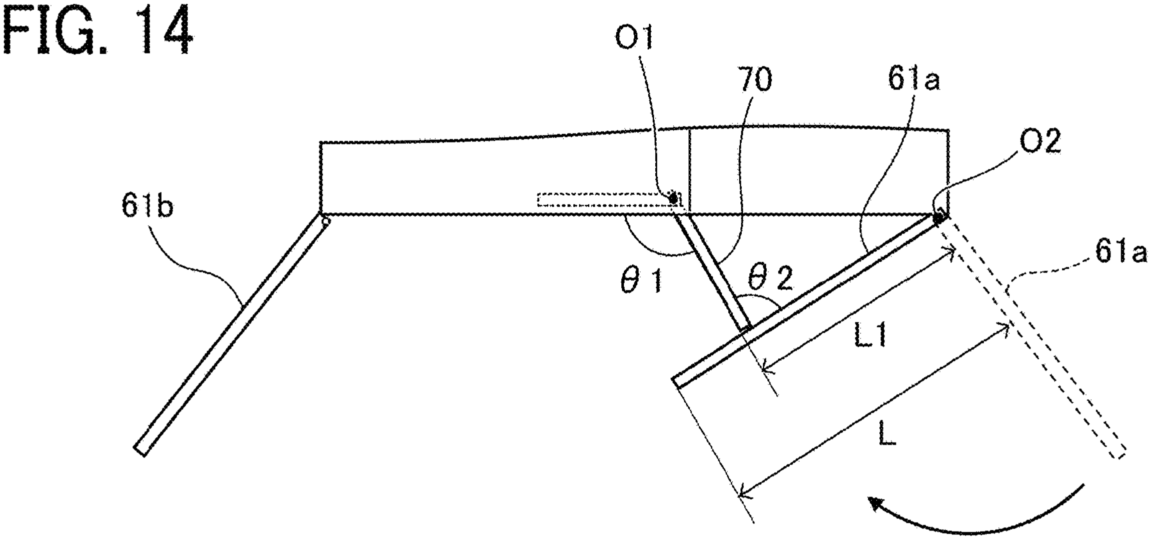
FIG. 14 is a top view of a part of the image forming apparatus including the front doors and the small transfer door that is not locked at a closed position by a lock, preventing the front door from closing.

FIG. 14 is a top view of a part of the image forming apparatus 60 including the front doors 61*a* and 61*b* and the small transfer door 70 that is not locked at the second closed position by the lock 75, preventing the front door 61*a* from closing.

As described above, the torsion spring 73 applies force to the small transfer door 70 toward the opening position, and the small transfer door 70 is at the opening position unless the small transfer door 70 is locked at the second closed position by the lock 75.

As illustrated in FIG. 14, the small transfer door 70 that is not locked at the second closed position by the lock 75 is positioned at the opening position. When the front door 61*a* is rotated to close the front door 61*a*, the small transfer door 70 at the opening position butts against the front door 61*a* to prevent the front door 61*a* from closing. In other words, the small transfer door 70 as the cover displaced from the second closed position in the opening direction restricts the movement of the front door 61*a* as the door to the first closed position.

As described above, correctly installing the belt cleaner 100 and the lubrication device 200 in the transfer unit 7 and positioning the lock levers at the lock positions enable closing the small transfer door 70. In other words, at least one of the belt cleaner 100 as the unit or the lubrication device 200 as the unit that is displaced from the mounting position in the body of the image forming apparatus interferes with the small transfer door 70 as the cover to restrict the movement of the small transfer door 70 as the cover to the second closed position. When the small transfer door 70 cannot be closed, the belt cleaner 100 or the lubrication device 200 may not be locked at the mounting position. If the front door 61*a* is closed when the belt cleaner 100 or the lubrication device 200 is not locked at the mounting position, the interlock switch 64*a* is turned on, the image forming apparatus is brought into an operable state. If the image forming apparatus starts image formation, the image forming apparatus does not operate properly and causes an image defect.

In contrast, when the small transfer door 70 is not closed in the present embodiment, the front door 61*a* cannot be closed, the interlock switch 64*a* is not turned on, and the image forming apparatus is not in the operable state. As a result, the configuration according to the present embodiment can prevent the image forming apparatus 60 including the belt cleaner 100 or the lubrication device 200 that is not locked at the mounting position from performing the image formation.

If the torsion spring 73 does not apply the force to the small transfer door 70 toward the opening position, the small transfer door 70 can be at a position between the second closed position and the opening position. If the small transfer door 70 is at a position close to the second closed position, it is difficult to visually determine whether the small transfer door 70 is closed. Accordingly, when the small transfer door 70 is not closed at the position close to the second closed position and butts the front door 61*a* to prevent closing the front door 61*a*, the user cannot easily find a cause that the user cannot close the front door 61*a*. It takes time to find the cause. As a result, downtime occurs.

In contrast, the biasing force of the torsion spring 73 in the present embodiment sets the small transfer door 70 that is not closed to be at the opening position. Accordingly, when the front door 61*a* is not closed, visually checking whether the small transfer door 70 is at the opening position enables determining whether the small transfer door 70 is the cause that the front door 61*a* is not closed. As a result, the user can easily find whether the cause that the front door 61*a* is not closed is the small transfer door 70 that is not closed or another reason factor, which can shorten a time to solve the disadvantage.

In the present embodiment, an opening angle θ1 of the small transfer door 70 at the opening position is 90° or more.

Figure 15A:
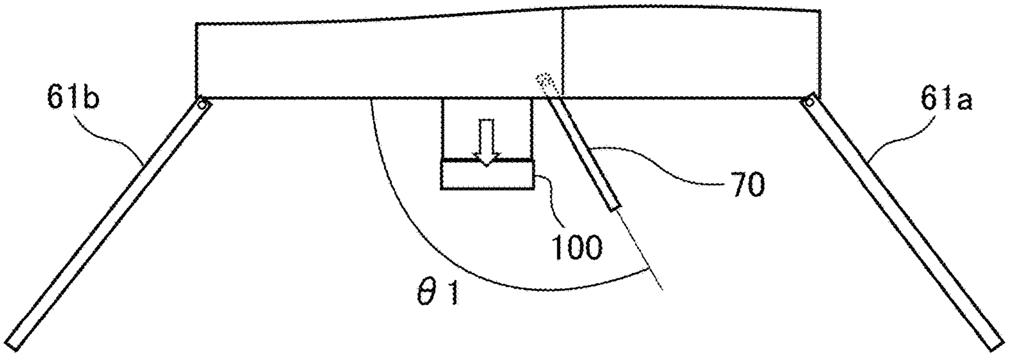
FIG. 15A is a top view of a part of the image forming apparatus including the front doors and the small transfer door that is opened by an opening angle $\theta 1$ equal to or larger than 90° to illustrate removing the belt cleaner.
Figure 15B:
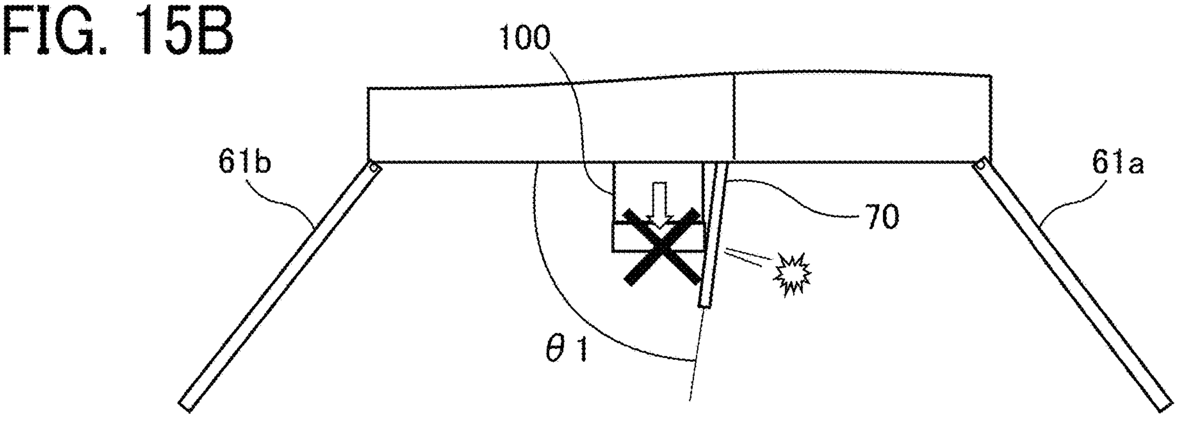
FIG. 15B is a top view of a part of the image forming apparatus including the front doors and the small transfer door that is opened by the opening angle $\theta 1$ less than 90° to illustrate removing the belt cleaner.

If the opening angle θ1 of the small transfer door 70 is less than 90°, as illustrated in FIG. 15B, the belt cleaner 100 disposed at a position close to the pivot point of rotation of the small transfer door 70 collides with the small transfer door 70 when the belt cleaner 100 is attached to or detached from the transfer unit 7. As a result, the belt cleaner 100 cannot be attached to and detached from the transfer unit 7. In contrast, as illustrated in FIG. 15A, setting the opening angle θ1 of the small transfer door 70 to be 90° or more can avoid the collision between the small transfer door 70 and the belt cleaner 100 when the belt cleaner 100 is attached to and detached from the transfer unit 7. In addition, setting the opening angle θ1 of the small transfer door 70 to be 90° or more improves the visibility of the belt cleaner 100 and the lubrication device 200 and enhances workability to attach or detach the belt cleaner 100 and the lubrication device 200.

Figure 16:
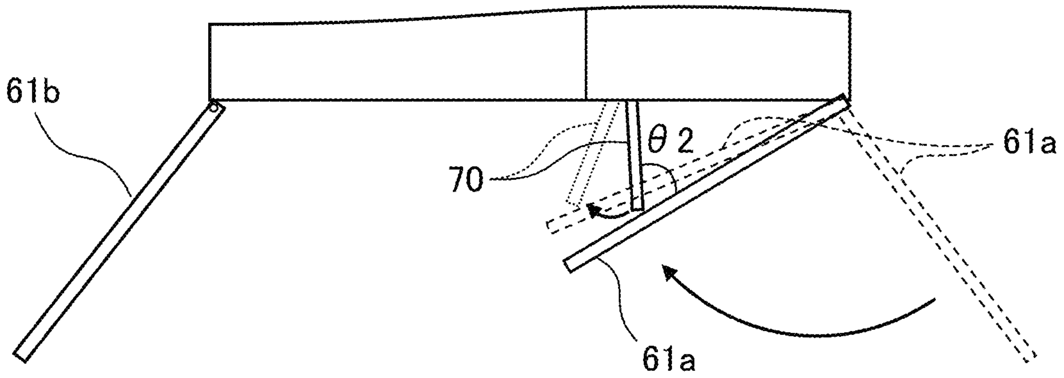
FIG. 16 is a top view of a part of the image forming apparatus including the front doors and the small transfer door to illustrate a disadvantage that occurs when an angle $\theta 2$ formed by the front door and the small transfer door butting against the front door is less than 70°.

As illustrated in FIG. 14, an angle θ2 formed by the small transfer door 70 at the opening position and the front door 61*a* in contact with the small transfer door 70 at the contact portion of the front door 61*a* is preferably 70° or more and 110° or less. As illustrated in FIG. 16, when the angle θ2 is less than 70°, a force to close the front door 61*a* may rotate the small transfer door 70 to the second closed position against the biasing force of the torsion spring 73. As a result, the front door 61*a* butts against the lock lever via the small transfer door 70, which may generate an impact damaging or deforming the lock lever and the unit.

The angle θ2 larger than 110° increase a force that further opens the small transfer door 70 from the opening position when the front door 61*a* collides with the small transfer door 70. The force may bend the small transfer door 70 to deform and damage the small transfer door 70.

On the other hand, setting the angle θ2 to 70° or more and 110° or less change the main force applied to the small transfer door 70 when the front door 61*a* collides with the small transfer door 70 to be an axial force and can reduce the deformation or breakage of the small transfer door 70 or rotation of the small transfer door 70 to the second closed position.

As illustrated in FIG. 14, the small transfer door 70 has one end having a pivot point O1 around which the other end of the small transfer door 70 is rotatable, and the front door 61*a* has one end having a pivot point O2 around which the other end of the front door 61*a* is rotatable in the present embodiment. In addition, the one end of the small transfer door 70 is closer to the pivot point O2 than the other end of the small transfer door 70 in a direction along a front side of the body of the image forming apparatus. A length of the front door 61*a* is longer than a length from the one end of the small transfer door 70 to the one end of the front door 61*a*. A rotation direction of the front door 61*a* to close the front door 61*a* is opposite to a rotation direction of the small transfer door 70 to open the small transfer door 70. As a result, the above-described structure enables setting the opening angle θ1 to 90° or more and setting the angle θ2 to 70° or more and 110° or less when the front door 61*a* butts the small transfer door 70.

Figure 17:
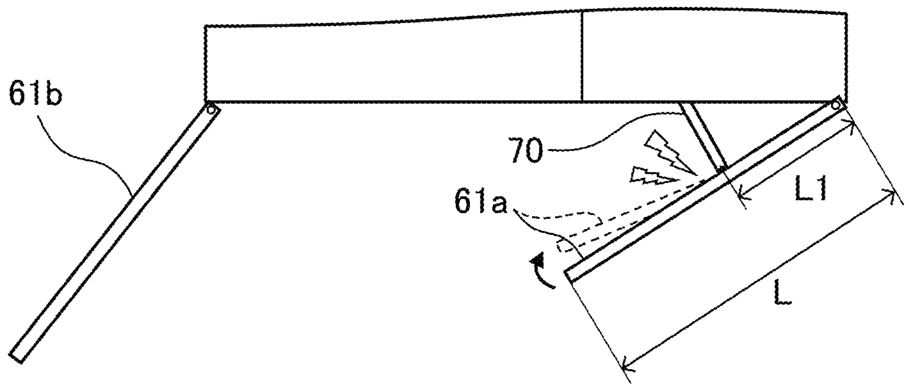
FIG. 17 is a top view of a part of the image forming apparatus including the front doors and the small transfer door to illustrate a disadvantage that occurs when a distance L1 from a pivot point of the front door to a contact position at which the front door contacts the small transfer door is less than half of a length L of the front door.

In addition, as illustrated in FIG. 14, a distance L1 from the pivot point O2 of the front door 61*a* to a contact position at which the front door 61*a* contacts the small transfer door 70 is equal to or greater than half a length L of the front door 61*a* (L1≥L/2). As illustrated in FIG. 17, if the distance L1 from the pivot point O2 of the front door 61*a* to the contact position between the front door 61a and the small transfer door 70 is less than half of the length L of the front door 61*a*, the front door 61*a* may be deformed or damaged. Specifically, the structure illustrated in FIG. 17 increases a bending moment applied to the front door 61*a* with the small transfer door 70 as a fulcrum when the front door 61*a* is further closed after the front door 61a butts against the small transfer door 70. As a result, the front door 61*a* may be deformed as indicated by a dashed line in FIG. 14. Further, a crack may occur at a contact position of the front door 61*a* with the small transfer door 70, and the front door 61*a* may be damaged.

Setting the distance L1 from the pivot point O2 of the front door 61*a* to the contact position between the front door 61*a* and the small transfer door 70 to a half or more of the length L of the front door 61*a* as illustrated in FIG. 14 reduces the bending moment applied to the front door 61*a* after the front door 61*a* contacts the small transfer door 70. The above-described structure can reduce the deformation and damage of the front door 61*a*.

Figure 18:
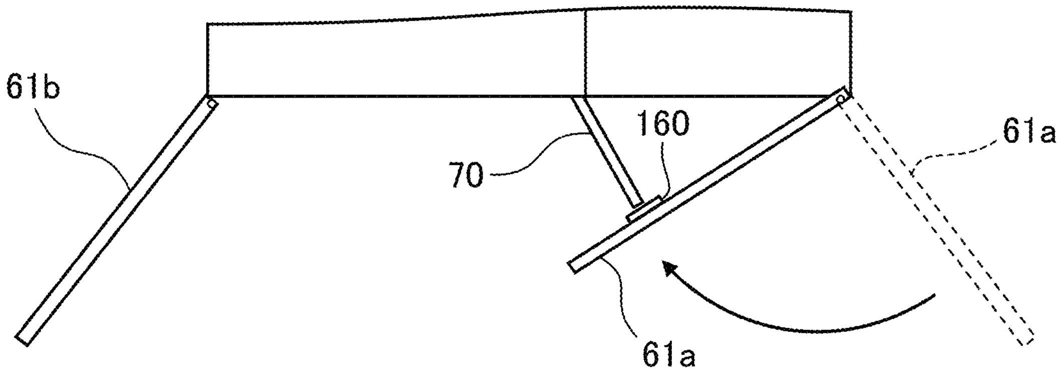
FIG. 18 is a top view of a part of the image forming apparatus including the small transfer door and the front door that includes an elastic member disposed at a contact portion at which the front door contacts the small transfer door.

Additionally, as illustrated in FIG. 18, the image forming apparatus may include an elastic member 160 such as rubber or sponge disposed on the contact portion of the front door 61*a* at which the front door 61*a* contacts the small transfer door 70 to absorb an impact when the front door 61*a* butts against the small transfer door 70. Since the small transfer door 70 bites into the elastic member 160, the small transfer door 70 is less likely to rotate when the front door 61*a* butts against the small transfer door 70. As a result, an allowable range of the angle θ2 can be widened, and the angle θ2 may be set to 60° or more and 120° or less. Although the elastic member is on the front door 61*a* in FIG. 18, the elastic member may be on a contact portion of the small transfer door 70 at which the small transfer door 70 contacts the front door 61*a*.

Figure 19:
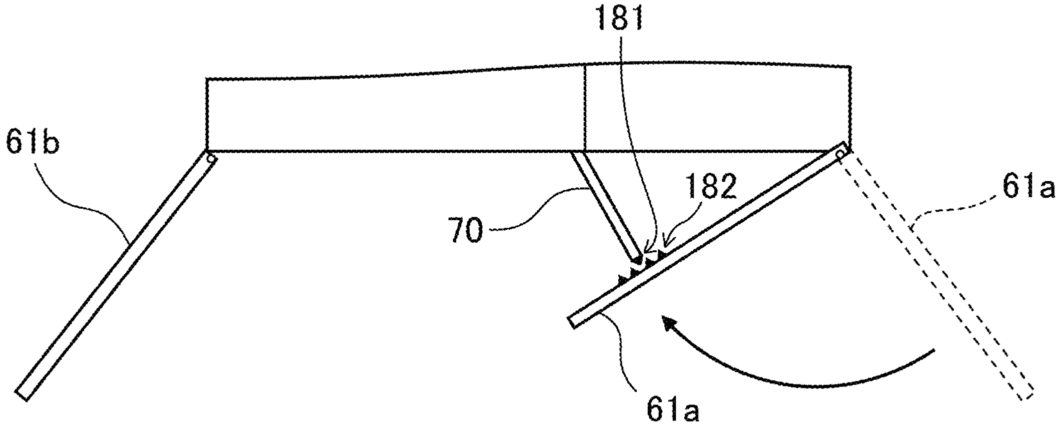
FIG. 19 is a top view of a part of the image forming apparatus including the front door having an engaged portion and the small transfer door having an engaging portion that engages the engaged portion at the contact portion at which the front door contacts the small transfer door.

As illustrated in FIG. 19, the small transfer door 70 may include an engaging portion 181 at a contact portion of the small transfer door 70 at which the small transfer door 70 contacts the front door 61*a*, and the front door 61*a* may include an engaged portion 182 at the contact portion of the front door 61*a* at which the front door 61*a* contacts the small transfer door 70. In FIG. 19, the engaging portion engageable with the engaged portion of the door is at a rotatable end of the cover rotatable around another end. Specifically, the engaged portion 182 is projections arranged at equal intervals on the contact portion of the front door 61*a*. The engaging portion 181 is provided at the tip of the small transfer door 70 and has a shape that fits in a valley between projections on the front door 61*a*. In the configuration illustrated in FIG. 19, the engaging portion 181 of the small transfer door 70 engages with the engaged portion 182 of the front door 61*a* when the front door 61*a* butts against the small transfer door 70.

The above-described configuration prevents rotation of the small transfer door 70 that is caused by collision between the front door 61*a* and the small transfer door 70. As a result, the above-described configuration can widen the allowable range of the angle θ2.

In the present embodiment, the lock levers not positioned at the lock positions prevent closing the small transfer door 70. Alternatively, the belt cleaner 100 and the lubrication device 200 that are not correctly installed in the transfer unit may butt against the small transfer door 70 to prevent closing the small transfer door 70.

In the present embodiment, the biasing force of the torsion spring 73 opens the small transfer door 70 to the opening position. However, the position to which the biasing force of the torsion spring 73 opens the small transfer door 70 may be a position that enables easily and visually confirming that the small transfer door 70 is not closed. The above-described configuration also enables easily confirming whether the cover such as the small transfer door 70 that is not closed prevents closing the door such as the front door 61*a*, shortening the time to solve the disadvantage.

The image forming apparatus may include a small door covering a detachable unit that is detachable from the front side of the image forming apparatus. The detachable unit is not limited to the belt cleaner 100 and the lubrication device 200. For example, the image forming apparatus may include a small door as the cover covering at least one of the process units 6Y, 6M, 6C, and 6K that are attachable to and detachable from the body of the image forming apparatus from the front side of the image forming apparatus and may be configured so that the process unit that is not correctly installed in the image forming apparatus prevents closing the small door. In addition, the image forming apparatus may be configured so that the small door that is not closed butts against at least one of the front doors 61*a* and 61*b* and prevents closing at least one of the front doors 61*a* and 61*b*. The above-described configuration can prevent the front doors 61*a* and 61*b* from colliding with the process unit that is not correctly installed in the image forming apparatus, which prevents the occurrence of deformation or breakage of the process unit. In addition, the biasing member such as a spring applying force to the small door toward the opening position of the small door enables visually confirming whether the small door is at the opening position. As a result, the above-described configuration enables simply confirming whether the small door that is not closed prevents closing the front door 61_a_ or 61_b_.

In addition, the image forming apparatus may include a small door as the cover covering the fixing device 40 that is detachable from the front side of the image forming apparatus, and the small door may have the same configuration as the small transfer door 70.

It is to be noted that the present disclosure is not to be considered limited to the above-described embodiments but can be changed within the range that can be conceived of by those skilled in the art, such as other embodiments, additions, modifications, deletions, and the scope of the present disclosure encompasses any aspect, as long as the aspect achieves the operation and advantageous effect of the present disclosure.

The configurations according to the above-descried embodiments are examples, and embodiments of the present disclosure are not limited to the above. For example, the following aspects can achieve effects described below.

First Aspect

In a first aspect, an image forming apparatus such as the image forming apparatus 60 includes a body, a door such as the front door 61_a_ or 61_b_, a unit such as the belt cleaner 100 or the lubrication device 200, a cover such as the small transfer door 70, a spring such as the torsion spring 73, and a lock such as the lock 75. The body has an opening such as the opening 60_a_. The door is disposed on the body and covers the opening at a first closed position. The unit is detachably attached to the body from the opening and disposed at a mounting position inside the body. The cover is inside the door and rotatable between a second closed position and an opening position in an opening direction. At the second closed position, the cover covers the unit at the mounting position. At the opening position, the cover forms an angle of 90 degrees or more with the body. The spring applies a force to the cover in the opening direction. The lock locks the cover at the second closed position. The cover is displaced from the second closed position in the opening direction restricts a movement of the door to the first closed position.

In the configuration according to the first aspect, the biasing force of the spring can open the cover to the position that enables easily and visually confirming the cover not closed when the lock does not lock the cover at the closed position. As a result, the above-described configuration can prevent the cover to be closed from being at a position close to the closed position of the cover, the position at which visually determining whether the cover is closed is difficult. Accordingly, the above-described configuration enables easily finding whether the cause that the cover is not closed is the cover that is not closed or another reason factor, which can shorten a time to solve the disadvantage.

Second Aspect

In a second aspect, the image forming apparatus according to the first aspect further includes a drawer unit drawable from the opening, and the drawer unit includes the unit and the cover in the drawer unit.

According to the second aspect, as described in the embodiments, the unit such as the belt cleaner 100 or the lubrication device 200 can be removed from the body independently of the drawer unit such as the transfer unit 7.

Third Aspect

In a third aspect, the unit in the image forming apparatus according to the first aspect or the second aspect is displaced from the mounting position in the body interferes with the cover to restrict the movement of the cover to the second closed position.

According to the third aspect, as described in the embodiments, the user can easily notice that the unit such as the belt cleaner 100 or the lubrication device 200 not at the mounting position prevents the cover such as the small transfer door 70 from closing. In addition, not closing the cover causes not closing the door such as the front door 61_a_, which prevents the image forming apparatus from operating. As a result, the image forming apparatus including the unit not correctly set does not operate.

Fourth Aspect

In a fourth aspect, the image forming apparatus according to any one of the first to third aspects further includes a lock lever such as the lock lever 90 or 203 that is movable between a lock position and an unlock position. At the lock position, the lock lever locks the unit such as the belt cleaner 100 or the lubrication device 200 at the mounting position. At the unlock position, the lock lever unlocks the unit. In addition, the cover includes a restricting member such as the first restricting member 71 or the second restricting member 72 on a back face of the cover, and the restricting member contacts the lock lever at the unlock position to restrict the movement of the cover to the second closed position.

According to the fourth aspect, as described in the embodiments, the lock lever that does not lock the unit such as the belt cleaner 100 or the lubrication device 200 to the mounting position prevents the cover such as the small transfer door 70 from closing. As a result, the user can notice that the unit such as the belt cleaner 100 or the lubrication device 200 is not correctly mounted. In addition, not closing the cover causes not closing the door such as the front door 61_a_, which prevents the image forming apparatus from operating. As a result, the image forming apparatus including the unit not correctly set does not operate.

Fifth Aspect

In a fifth aspect, the image forming apparatus according to any one of the first to fourth aspects further includes a stopper such as the stopper 74 to stop the cover forced by the spring at the opening position, and the cover at the opening position contacts a contact portion of the door to restrict the movement of the door to the first closed position.

According to the fifth aspect, the stopper stopping the cover at the opening position improves the visibility of the unit such as the belt cleaner 100 and the lubrication device 200 and enhances workability to attach or detach the unit.

Sixth Aspect

In a sixth aspect, an angle formed by the cover at the opening position and the door in contact with the cover at the contact portion in the image forming apparatus according to the fifth aspect is 70° or more and 110° or less.

According to the sixth aspect, as described in the embodiments, setting the angle as described above changes the main force applied to the cover such as the small transfer door 70 when the door such as the front door 61*a* collides with the cover such as the small transfer door 70 to be the axial force and can reduce the deformation or breakage of the cover or rotation of the cover to the closed position.

Seventh Aspect

In a seventh aspect, the cover such as the small transfer door 70 in the image forming apparatus according to the sixth aspect has one end having a first pivot point around which another end of the cover is rotatable, and the door such as the front door 61*a* has one end having a second pivot point around which another end of the door is rotatable. The one end of the cover is closer to the second pivot point than the another end of the cover in a direction along a front side of the body. A length of the door is longer than a length from the one end of the cover to the one end of the door, and a rotation direction of the door to close the door is opposite to a rotation direction of the cover to open the cover.

According to the seventh aspect, as described in the embodiments, an angle formed by the cover such as the small transfer door 70 at the opening position and the door such as the front door 61*a* contacting the cover is set to 70° or more and 110° or less, and the opening angle θ1 is set to 90° or more.

Eighth Aspect

In an eighth aspect, the image forming apparatus according to any one of the first to seventh aspects further includes an interlock switch such as the interlock switch 64*a* turned on by the door such as the front door 61*a* at the first closed position.

According to the eighth aspect, as described in the embodiments, closing the door such as the front door 61*a* turns on the interlock switch, which enables the image forming apparatus to be operable. As a result, the image forming apparatus including the unit not correctly set does not operate.

Ninth Aspect

In a ninth aspect, the cover such as the small transfer door 70 and the door such as the front door 61*a* in the image forming apparatus according to any one of the fifth to eighth aspects satisfy the following relation.

$$L1 \geq (L/2),$$

where L1 is a distance from the second pivot point of the door to a contact position at which the door contacts the cover at the opening position, and L is a distance from the second pivot point to another end of the door.

As described in the embodiments, the configuration according to the ninth aspect reduces the bending moment applied to the door such as the front door 61*a* after the door contacts the cover such as the small transfer door 70. As a result, the above-described structure can reduce the deformation and damage of the door.

Tenth Aspect

In a tenth aspect, the image forming apparatus according to any one of the fifth to ninth aspects further includes an elastic member such as the elastic member 160 on at least one of the contact portion of the door such as the front door 61*a* or a leading end portion of the cover such as the small transfer door 70 that is rotatable around a pivot point.

According to the tenth aspect, as described with reference to FIG. 18, the elastic member such as the elastic member 160 can absorb the impact when the door such as the front door 61*a* butts against the cover such as the small transfer door 70 and reduce the deformation and damage of the door and the cover.

Eleventh Aspect

In an eleventh aspect, the door in the image forming apparatus according to any one of the fifth to tenth aspects includes an engaged portion such as the engaged portion 182 at the contact portion of the door, and the cover includes an engaging portion such as the engaging portion 181 engageable with the engaged portion of the door at a rotatable end of the cover rotatable around another end.

As described with reference to FIG. 19, the configuration according to the eleventh aspect prevents the rotation of the cover such as the small transfer door 70 that is caused by collision between the door such as the front door 61*a* and the cover such as the small transfer door 70.

Twelfth Aspect

In a twelfth aspect, the drawer unit in the image forming apparatus according to the second aspect includes a transfer unit such as the transfer unit 7 including an intermediate transfer belt such as the intermediate transfer belt 8, and the unit in the image forming apparatus according to the second aspect includes a lubrication device such as the lubrication device 200 to apply lubricant to a surface of the intermediate transfer belt such as the intermediate transfer belt 8.

According to the twelfth aspect, as described in the embodiments, the lubrication device such as the lubrication device 200 can be attached to and detached from the transfer unit 7 remaining in the body of the image forming apparatus. The above-described configuration enables easily performing periodic maintenance and replacement of the lubrication device such as the lubrication device 200. In addition, the above-described configuration can prevent the operation of the image forming apparatus including the lubrication device such as the lubrication device 200 not correctly mounted.

Thirteenth Aspect

In a thirteenth aspect, the drawer unit in the image forming apparatus according to the second aspect includes a transfer unit such as the transfer unit 7 including an intermediate transfer belt such as the intermediate transfer belt 8, and the unit in the image forming apparatus according to the second aspect includes a belt cleaner such as the belt cleaner 100 to clean the intermediate transfer belt such as the intermediate transfer belt 8.

According to the thirteenth aspect, as described in the embodiments, the belt cleaner such as the belt cleaner 100 can be attached to and detached from the transfer unit 7 remaining in the body of the image forming apparatus. The above-described configuration enables easily performing periodic maintenance and replacement of the belt cleaner such as the belt cleaner 100. In addition, the above-described configuration can prevent the operation of the image forming apparatus including the belt cleaner such as the belt cleaner 100 not correctly mounted.

Fourteenth Aspect

In a fourteenth aspect, the image forming apparatus according to the thirteenth aspect includes the belt cleaner such as the belt cleaner 100, the transfer unit such as the transfer unit 7, and a contact and separation mechanism such as the contact and separation mechanism 120. The belt cleaner includes a cleaner such as the cleaning brush roller 101 contacting the intermediate transfer belt such as the intermediate transfer belt 8. The transfer unit includes a lock lever such as the cleaning lock lever 90 to lock the belt cleaner at the mounting position. The contact and separation mechanism separates the intermediate transfer belt from the cleaner in conjunction with a movement of the lock lever from a lock position to an unlock position of the lock lever.

As described in the embodiments, the configuration according to the fourteenth aspect can separate the intermediate transfer belt such as the intermediate transfer belt 8 from the cleaner such as the cleaning brush roller in the belt cleaner such as the belt cleaner 100 that is unlocked and is detachable. The above-described configuration can prevent the cleaner in the belt cleaner such as the belt cleaner 100 that is detached from the transfer unit from sliding on the surface of the intermediate transfer belt such as the intermediate transfer belt 8 and prevent the surface of the intermediate transfer belt from being damaged.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:
- a body having an opening;
- a door on the body, the door covering the opening at a first closed position;
- a unit detachably attached to the body from the opening and disposed at a mounting position inside the body;
- a cover inside the door and rotatable between:
  - a second closed position in which the cover covers the unit at the mounting position; and
  - an opening position in which the cover forms an angle of 90 degrees or more with the body, in an opening direction;
- a spring applying a force to the cover in the opening direction; and
- a lock to lock the cover at the second closed position,
- wherein the cover displaced from the second closed position in the opening direction restricts a movement of the door to the first closed position,
- the image forming apparatus further comprising:
- a lock lever movable between:
- a lock position at which the lock lever locks the unit at the mounting position; and
- an unlock position at which the lock lever unlock the unit,
- wherein the cover includes a restrictor on a back face of the cover, and
- the restrictor contacts the lock lever at the unlock position to restrict the movement of the cover to the second closed position.

2. The image forming apparatus according to claim 1, further comprising:
- a drawer unit drawable from the opening,
- wherein the drawer unit includes the unit and the cover in the drawer unit.

3. The image forming apparatus according to claim 2, wherein:
- the drawer unit includes a transfer unit including an intermediate transfer belt, and

- the unit includes a lubrication device to apply lubricant to a surface of the intermediate transfer belt.

4. The image forming apparatus according to claim 2, wherein:
- the drawer unit includes a transfer unit including an intermediate transfer belt, and
- the unit includes a belt cleaner to clean the intermediate transfer belt.

5. The image forming apparatus according to claim 4, wherein:
- the belt cleaner includes a cleaner contacting the intermediate transfer belt, and
- the transfer unit includes:
  - the lock lever to lock the belt cleaner at the mounting position; and
  - a contact and separation mechanism to separate the intermediate transfer belt from the cleaner in conjunction with a movement of the lock lever from the lock position to the unlock position of the lock lever.

6. The image forming apparatus according to claim 1,
- wherein the unit displaced from the mounting position in the body interferes with the cover to restrict the movement of the cover to the second closed position.

7. The image forming apparatus according to claim 1, further comprising:
- a stopper to stop the cover forced by the spring at the opening position,
- wherein the cover at the opening position contacts a contact portion of the door to restrict the movement of the door to the first closed position.

8. The image forming apparatus according to claim 7,
- wherein an angle formed by the cover at the opening position and the door in contact with the cover at the contact portion is 70° or more and 110° or less.

9. The image forming apparatus according to claim 8,
- wherein the cover has one end having a first pivot point around which another end of the cover is rotatable,
- the door has one end having a second pivot point around which another end of the door is rotatable,
- the one end of the cover is closer to the second pivot point than the another end of the cover in a direction along a front side of the body,
- a length of the door is longer than a length from the one end of the cover to the one end of the door, and
- a rotation direction of the door to close the door is opposite to a rotation direction of the cover to open the cover.

10. The image forming apparatus according to claim 9, wherein:
- the cover and the door satisfy $$L1 \geq (L/2),$$

- where L1 is a distance from the second pivot point of the door to a contact position at which the door contacts the cover at the opening position, and
- L is a distance from the second pivot point to another end of the door.

11. The image forming apparatus according to claim 7, further comprising:
- an elastic member on at least one of the contact portion of the door or a leading end portion of the cover rotatable around a pivot point.

12. The image forming apparatus according to claim 7, wherein;
- the door includes an engaged portion at the contact portion on the door, and the cover includes an engaging portion engageable with the engaged portion of the door at a rotatable end of the cover rotatable around another end.

13. The image forming apparatus according to claim 1, further comprising an interlock switch turned on by the door at the first closed position.

14. An image forming apparatus comprising:

a body having an opening;

a door on the body, the door covering the opening at a first closed position;

a unit detachably attached to the body from the opening and disposed at a mounting position inside the body;

a cover inside the door and rotatable between:

a second closed position in which the cover covers the unit at the mounting position; and an opening position in which the cover forms an angle of 90 degrees or more with the body, in an opening direction;

a spring applying a force to the cover in the opening direction; and a lock to lock the cover at the second closed position, wherein the cover displaced from the second closed position in the opening direction restricts a movement of the door to the first closed position, the image forming apparatus further comprising a drawer unit drawable from the opening, wherein:

the drawer unit includes the unit and the cover in the drawer unit, the drawer unit includes a transfer unit including an intermediate transfer belt, the unit includes a belt cleaner to clean the intermediate transfer belt, the belt cleaner includes a cleaner contacting the intermediate transfer belt, and the transfer unit includes a lock lever to lock the belt cleaner at the mounting position and a contact and separation mechanism to separate the intermediate transfer belt from the cleaner in conjunction with a movement of the lock lever from a lock position to an unlock position of the lock lever.

15. The image forming apparatus according to claim 14, wherein the unit displaced from the mounting position in the body interferes with the cover to restrict the movement of the cover to the second closed position.

16. The image forming apparatus according to claim 14, wherein:

the lock lever is movable between:

a lock position at which the lock lever locks the unit at the mounting position; and an unlock position at which the lock lever unlock the unit, the cover includes a restrictor on a back face of the cover, and the restrictor contacts the lock lever at the unlock position to restrict the movement of the cover to the second closed position.

17. The image forming apparatus according to claim 14, further comprising:

a stopper to stop the cover forced by the spring at the opening position, wherein the cover at the opening position contacts a contact portion of the door to restrict the movement of the door to the first closed position.

* * * * *